Figure 2A:
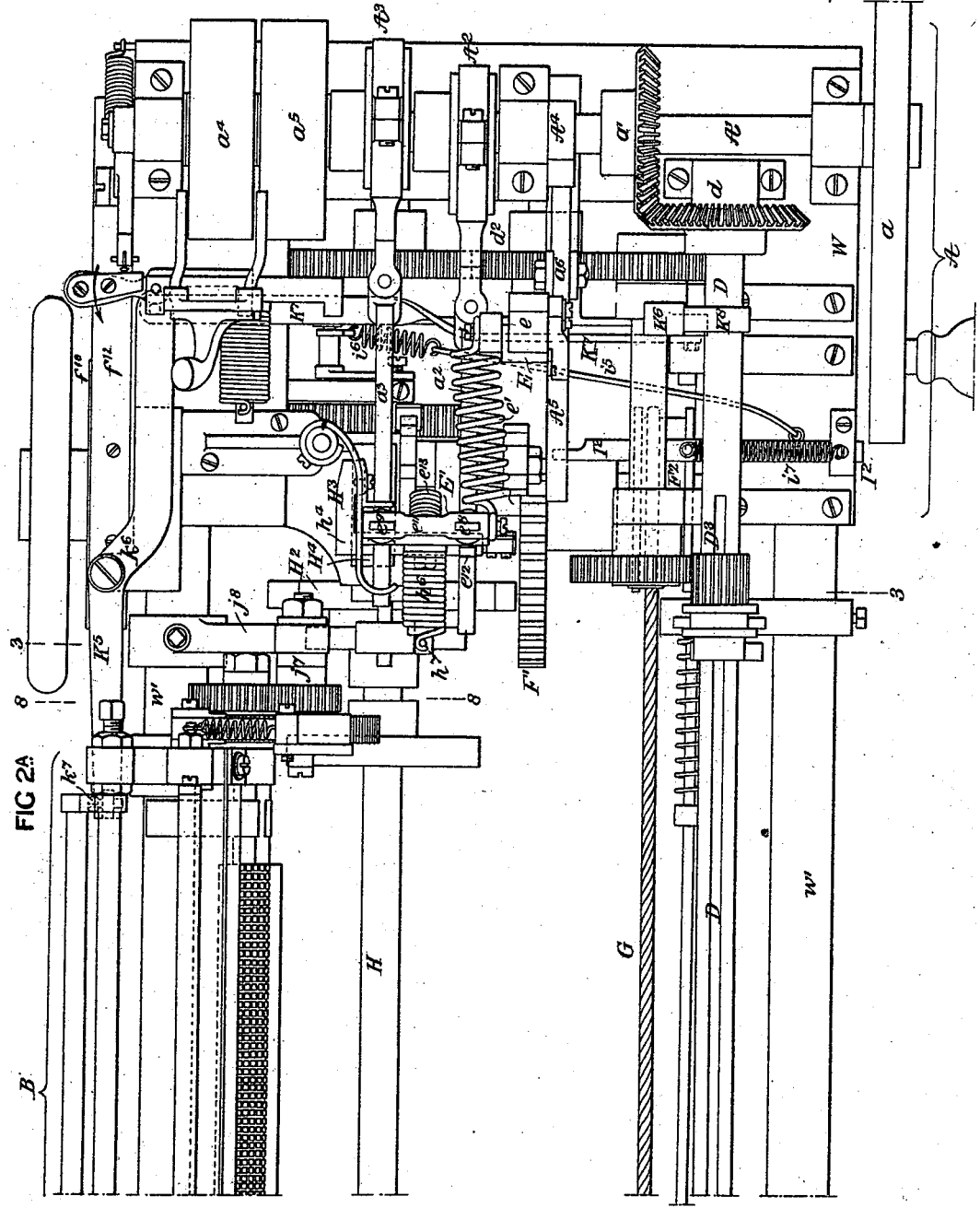

(No Model.)  17 Sheets—Sheet 1.
C. W. ARNOLD.
CARD SETTING MACHINE.
No. 528,354.  Patented Oct. 30, 1894.
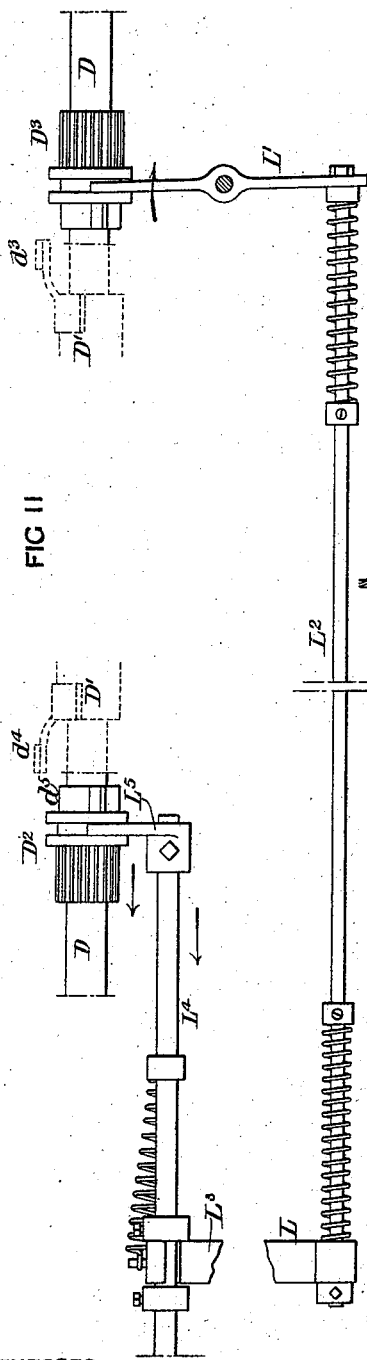
FIG II
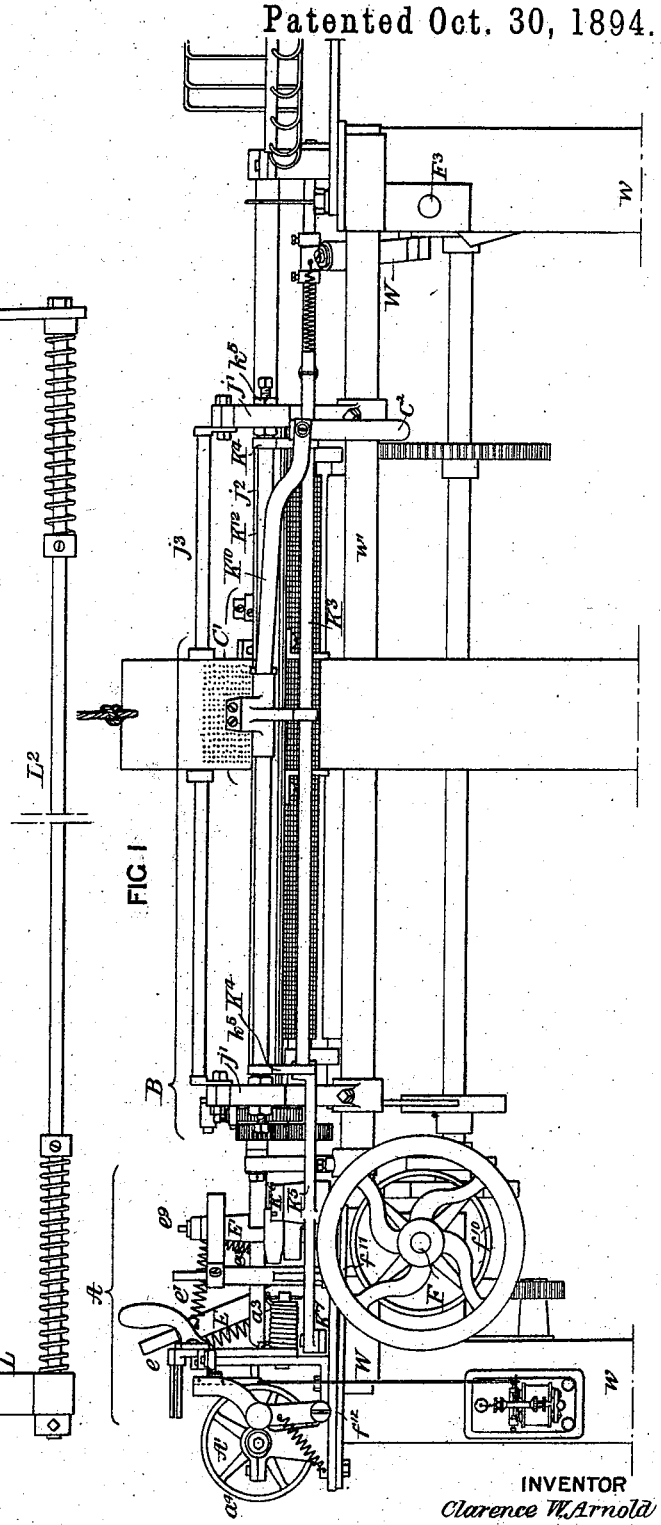
FIG. I
WITNESSES
R Schleicher
Will. A. Barr
INVENTOR
Clarence W. Arnold
By his Attorneys
Howson & Howson (No Model.) 17 Sheets—Sheet 2.

C. W. ARNOLD.
CARD SETTING MACHINE.

No. 528,354. Patented Oct. 30, 1894.

WITNESSES
R Schleicher
Will. N. Barr.

INVENTOR
Clarence W. Arnold.
By his Attorneys
Howson & Howson (No Model.) 17 Sheets—Sheet 3.
C. W. ARNOLD.
CARD SETTING MACHINE.
No. 528,354. Patented Oct. 30, 1894.
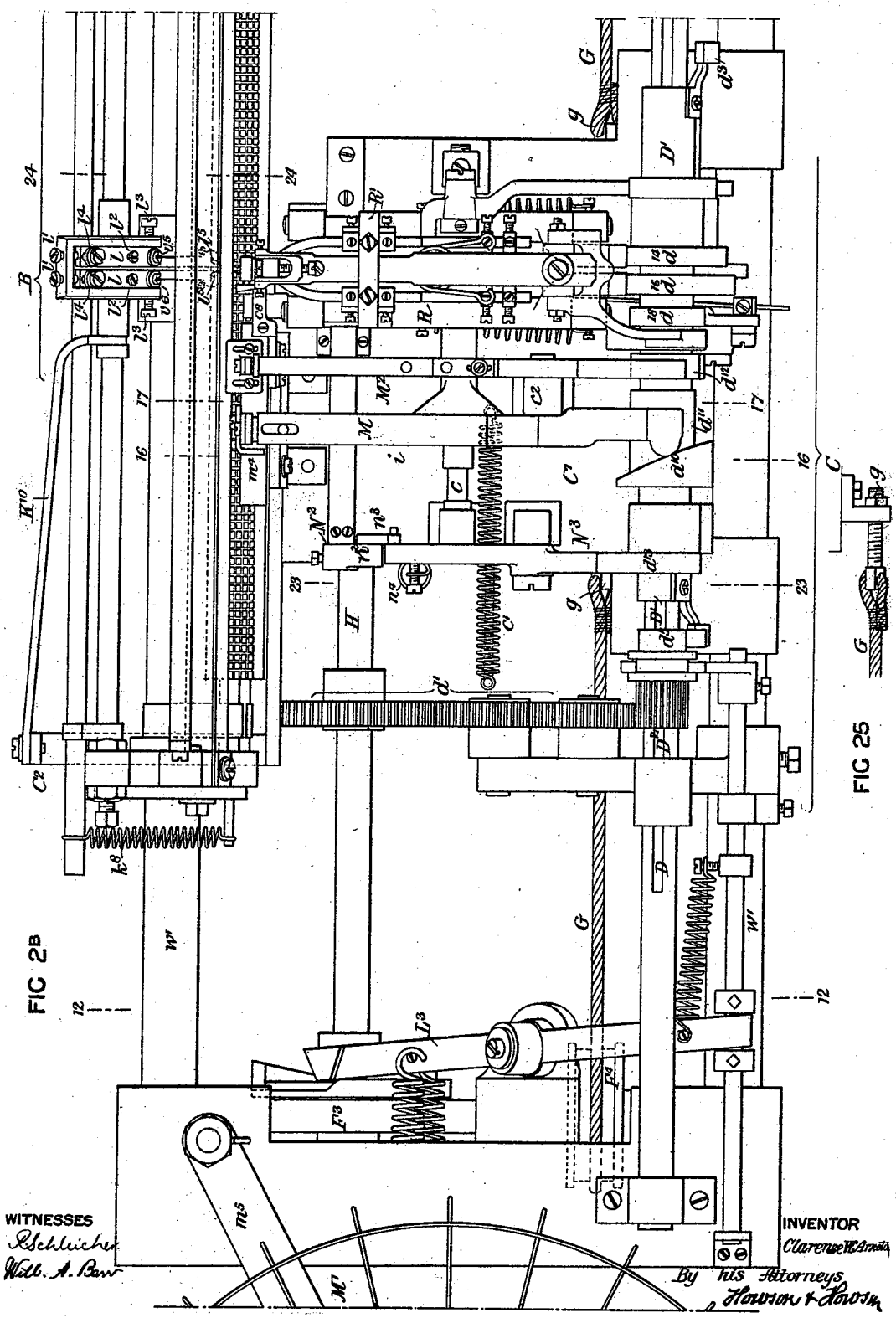

(No Model.)

17 Sheets—Sheet 4.

C. W. ARNOLD.
CARD SETTING MACHINE.

No. 528,354.

Patented Oct. 30, 1894.

WITNESSES
R. Schleicher
Will. H. Baw.

INVENTOR
Clarence W. Arnold
By his Attorneys
Howson & Howson (No Model.)

17 Sheets—Sheet 5.

C. W. ARNOLD.
CARD SETTING MACHINE.

No. 528,354.

Patented Oct. 30, 1894.

WITNESSES
R. Schleicher
Will. A. Barr

INVENTOR
Clarence W. Arnold
By his Attorneys (No Model.) 17 Sheets—Sheet 6.
C. W. ARNOLD.
CARD SETTING MACHINE.
No. 528,354. Patented Oct. 30, 1894.
FIG 8
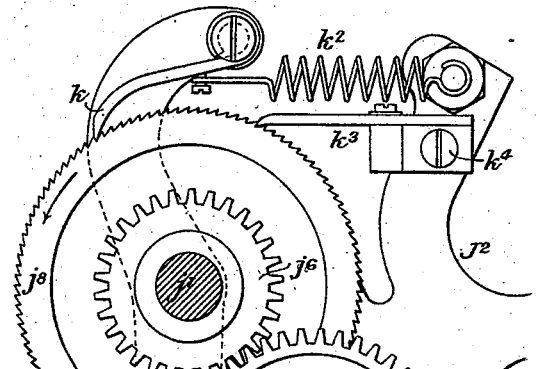
FIG 9
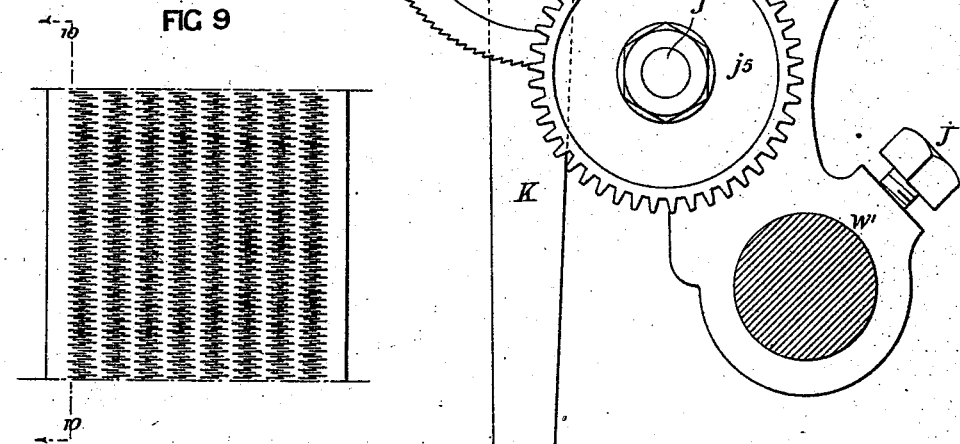
FIG 10
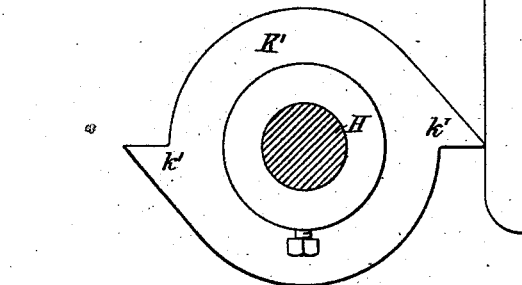
WITNESSES
R. Schleicher
Will. A. Barr
INVENTOR
Clarence W. Arnold
By his Attorneys
Howson & Howson (No Model.) 17 Sheets—Sheet 7.

C. W. ARNOLD.
CARD SETTING MACHINE.

No. 528,354. Patented Oct. 30, 1894.

WITNESSES
INVENTOR
Clarence W. Arnold
By his Attorneys (No Model.) 17 Sheets—Sheet 8.

C. W. ARNOLD.
CARD SETTING MACHINE.

No. 528,354. Patented Oct. 30, 1894.

WITNESSES
R. Schleicher
Will. A. Barr

INVENTOR
Clarence W. Arnold
By his Attorneys
Howson & Howson

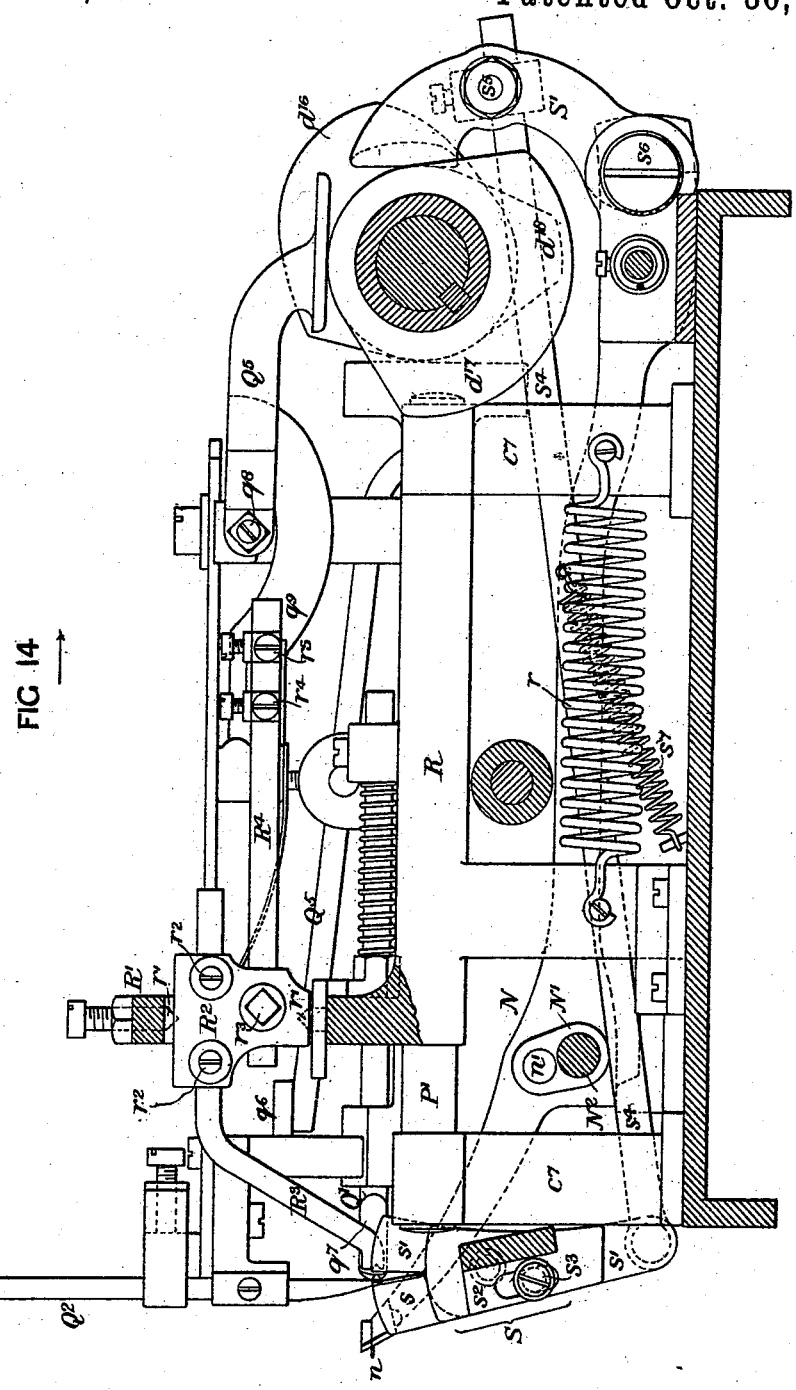

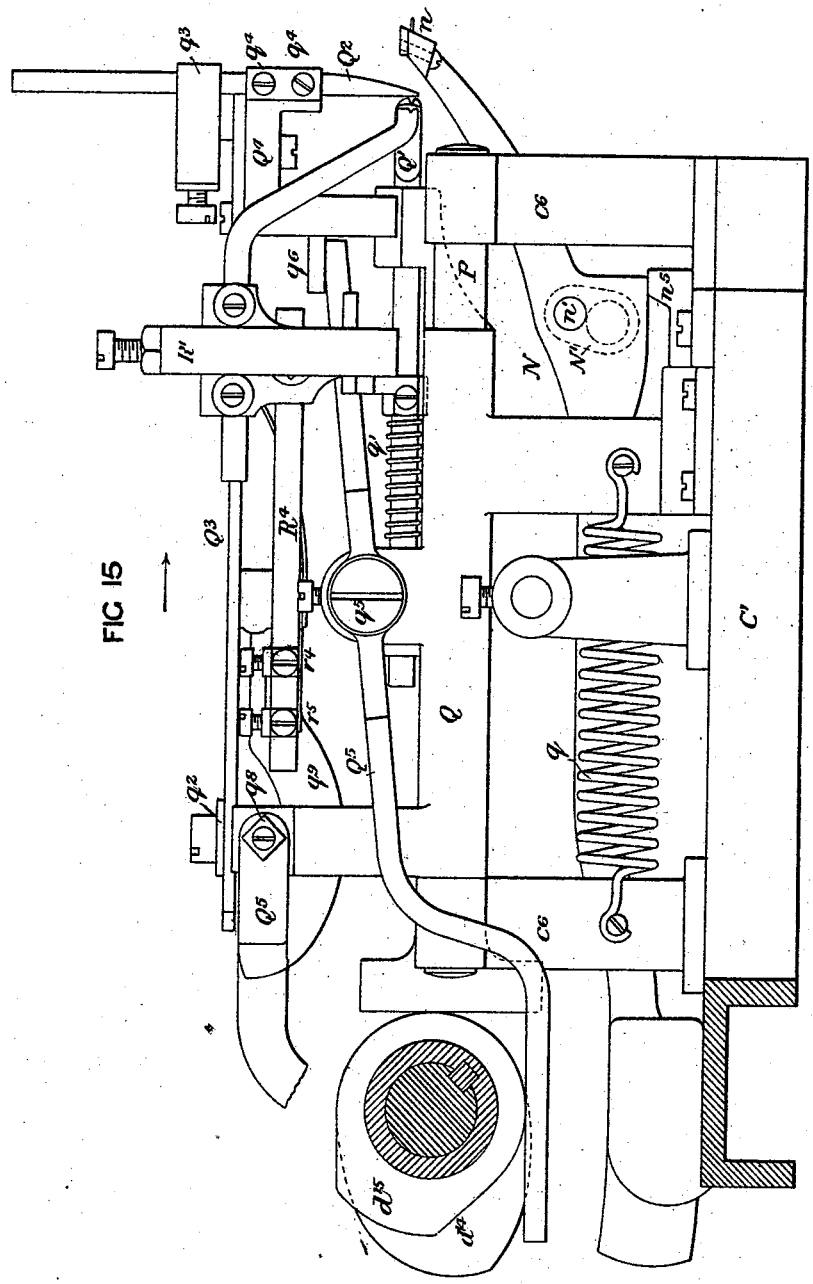

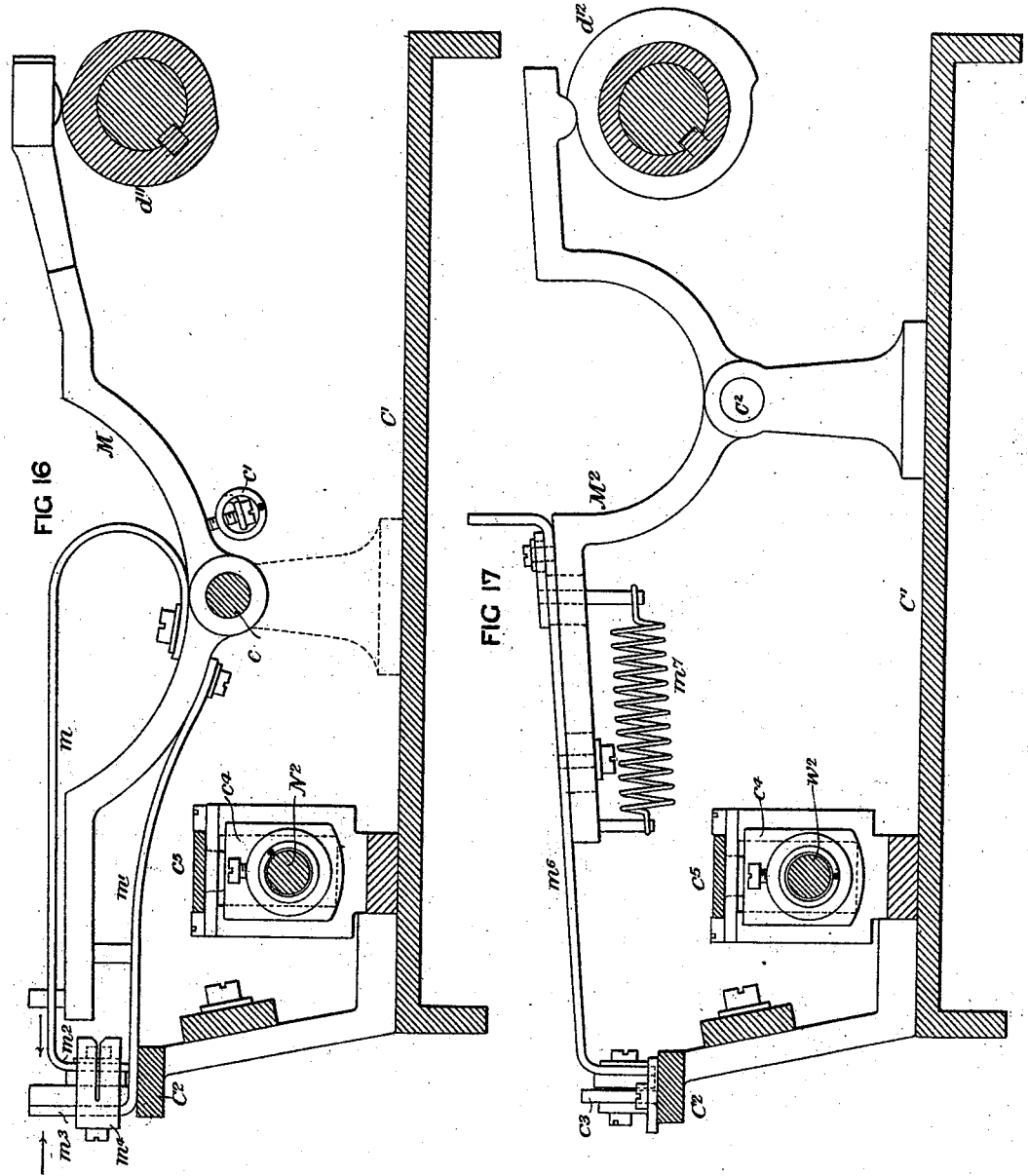

(No Model.) 17 Sheets—Sheet 12.
C. W. ARNOLD.
CARD SETTING MACHINE.
No. 528,354. Patented Oct. 30, 1894.
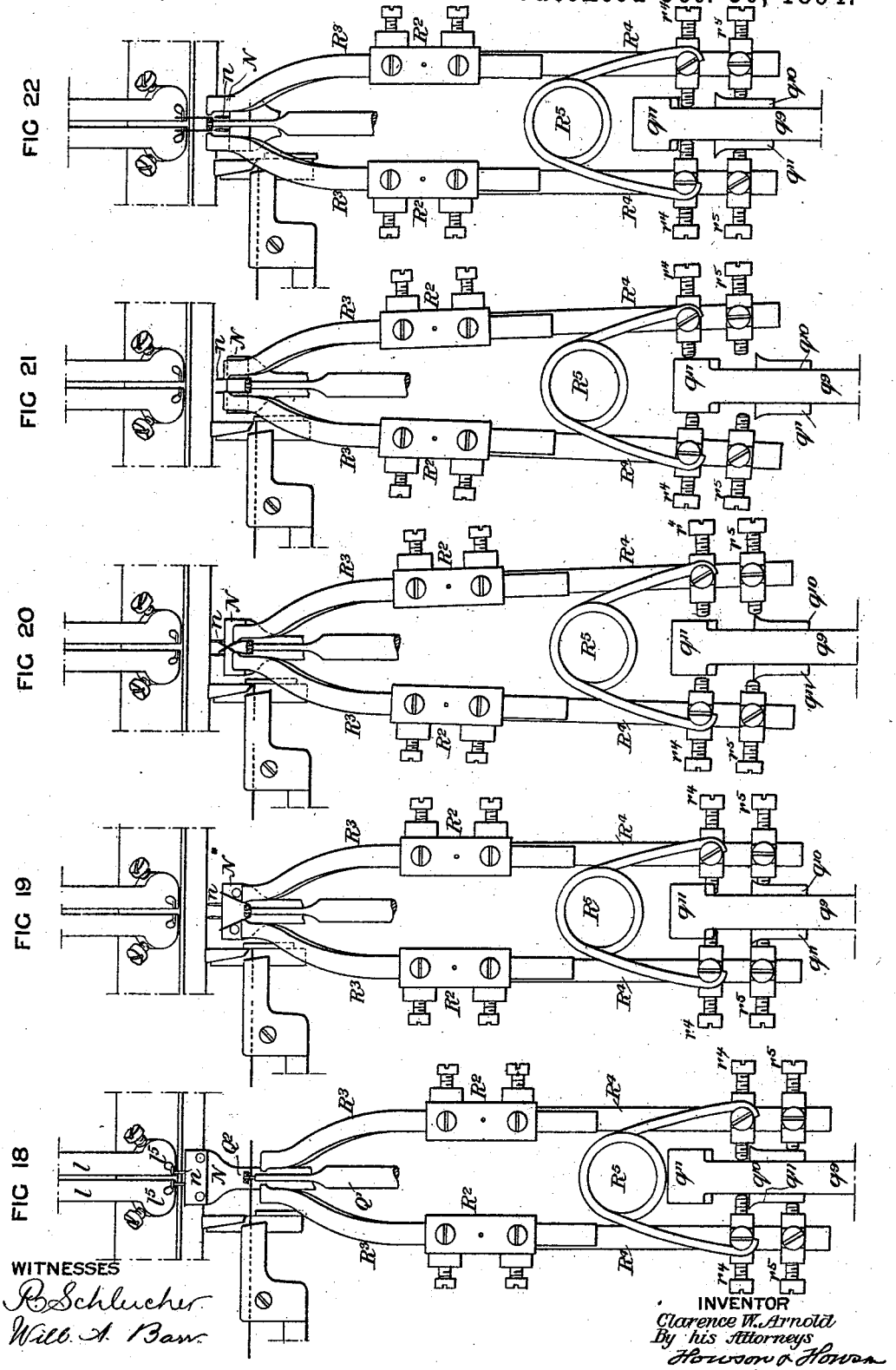
WITNESSES
INVENTOR
Clarence W. Arnold
By his Attorneys (No Model.) 17 Sheets—Sheet 13.

C. W. ARNOLD.
CARD SETTING MACHINE.

No. 528,354. Patented Oct. 30, 1894.

WITNESSES
R. Schleicher
Will. A. Barr

INVENTOR
Clarence W. Arnold
By his Attorneys
Howson & Howson (No Model.)

17 Sheets—Sheet 14.

C. W. ARNOLD.
CARD SETTING MACHINE.

No. 528,354.   Patented Oct. 30, 1894.

WITNESSES
R. Schleicher
Will A. Baw

INVENTOR
Clarence W. Arnold
By his Attorneys
Howson & Howson

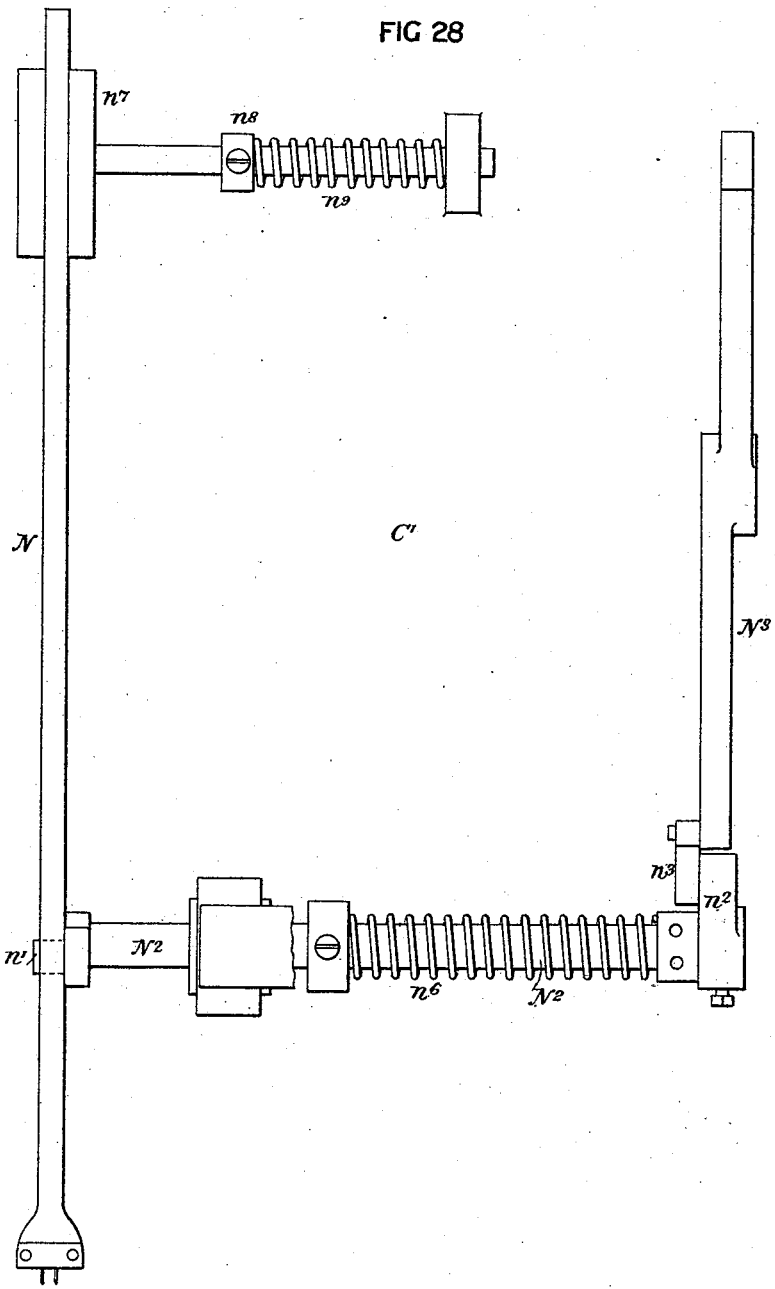

(No Model.) 17 Sheets—Sheet 16.

C. W. ARNOLD.
CARD SETTING MACHINE.

No. 528,354. Patented Oct. 30, 1894.

WITNESSES
R. Schleicher
Will. A. Barr.

INVENTOR
Clarence W. Arnold
By his Attorneys (No Model.)  17 Sheets—Sheet 17.
C. W. ARNOLD.
CARD SETTING MACHINE.
No. 528,354.  Patented Oct. 30, 1894.
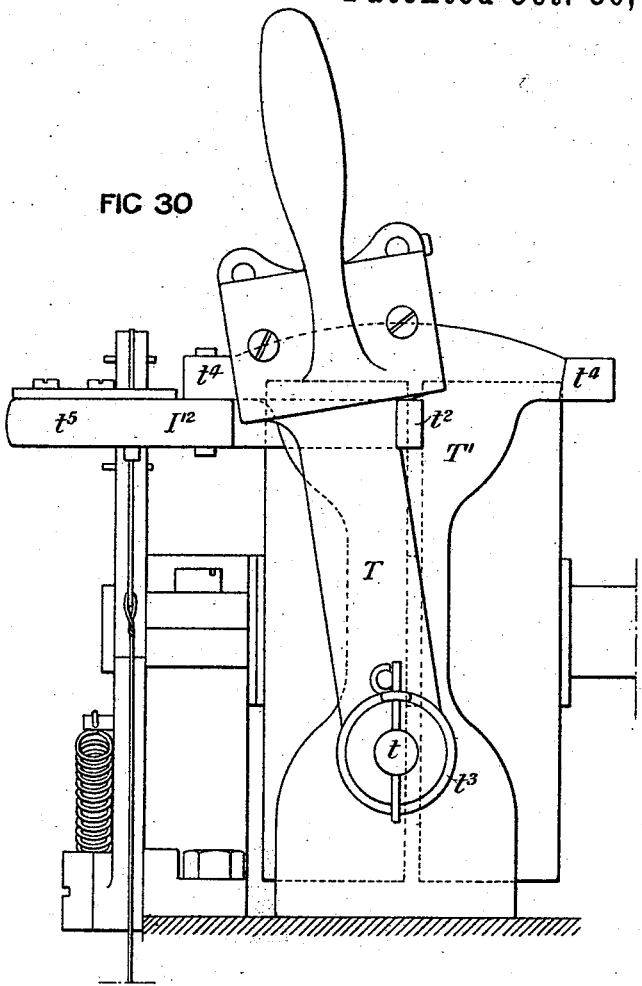
FIG 30
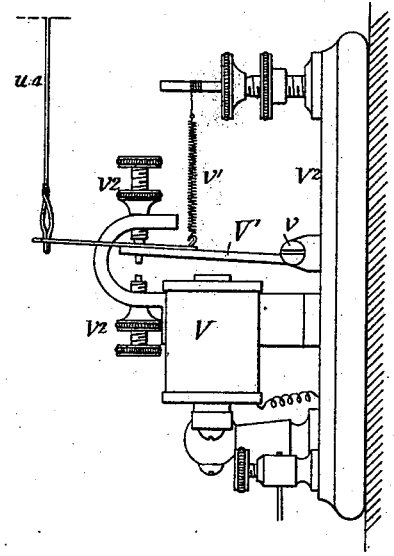
WITNESSES
R Schleicher
Will. A. Barr
INVENTOR
Clarence W Arnold
By his Attorneys

United States Patent Office.

CLARENCE W. ARNOLD, OF PHILADELPHIA, PENNSYLVANIA.

CARD-SETTING MACHINE.

SPECIFICATION forming part of Letters Patent No. 528,354, dated October 30, 1894.

Application filed August 2, 1894. Serial No. 519,315. (No model.)

*To all whom it may concern:*

Be it known that I, CLARENCE W. ARNOLD, a citizen of the United States, residing in Philadelphia, Pennsylvania, have invented certain Improvements in Card-Setting Machines, of which the following is a specification.

My invention relates to certain improvements in card sticking or setting machines, that is, machines in which a strip or sheet of fabric or leather is provided with a series of teeth, technically known as card clothing.

The main object of my invention is to so construct a machine for this purpose that it can be driven at a high rate of speed and can be adapted for setting teeth either in sheets or fillets.

A further object of my invention is to so construct the machine that two or more carriages can be driven from a single head and to readily change the machine so that it will set teeth of different crowns and to make the forward movement positive to prevent the carriage overthrowing when the machine is driven at a high rate of speed.

My invention also relates to special construction of mechanism relating to details of the machine which will be fully described hereinafter, reference being had to the accompanying drawings, in which—

Figure 3:
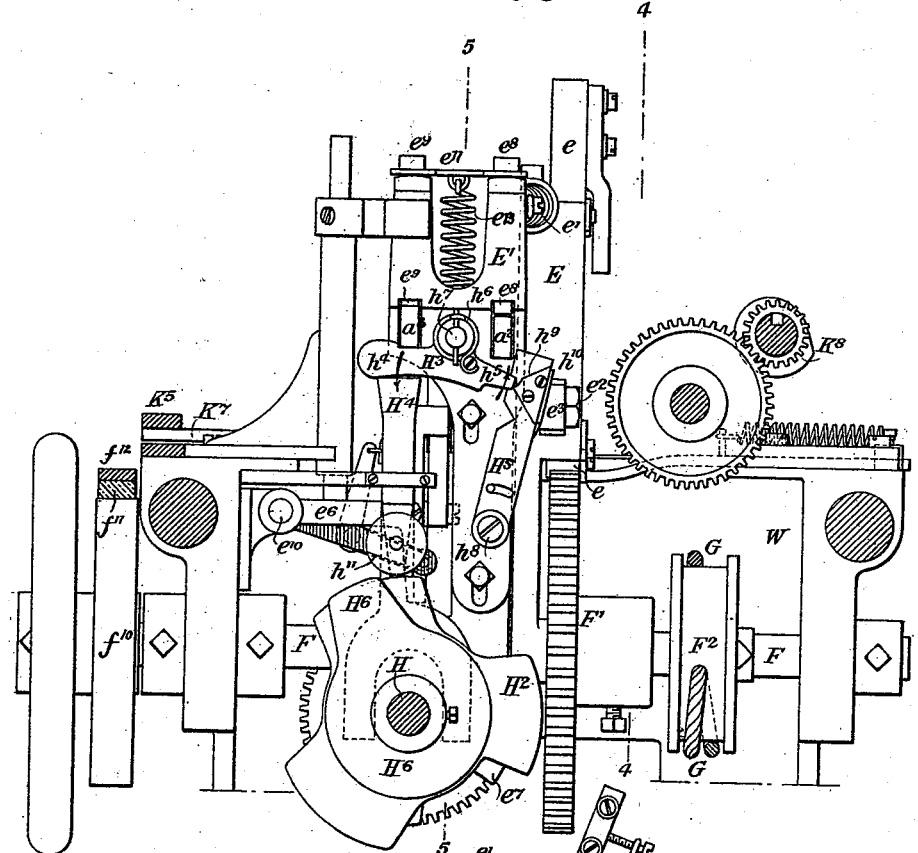
Figure 4:
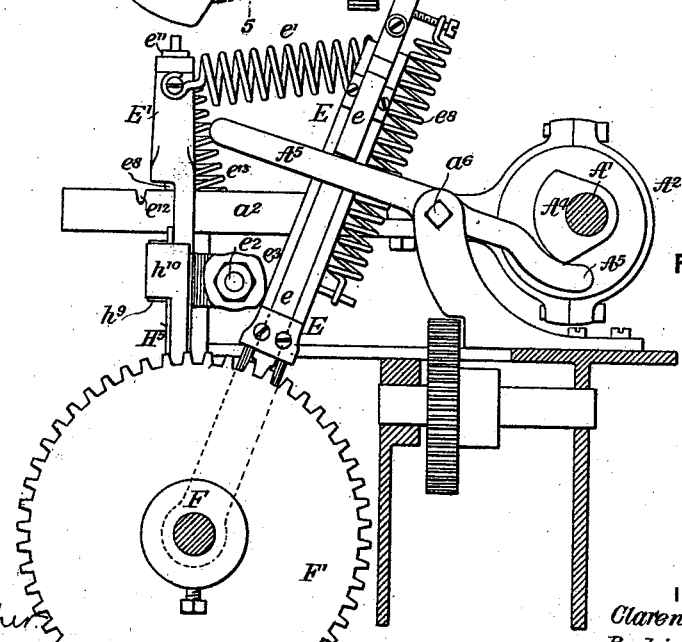
Figure 5:
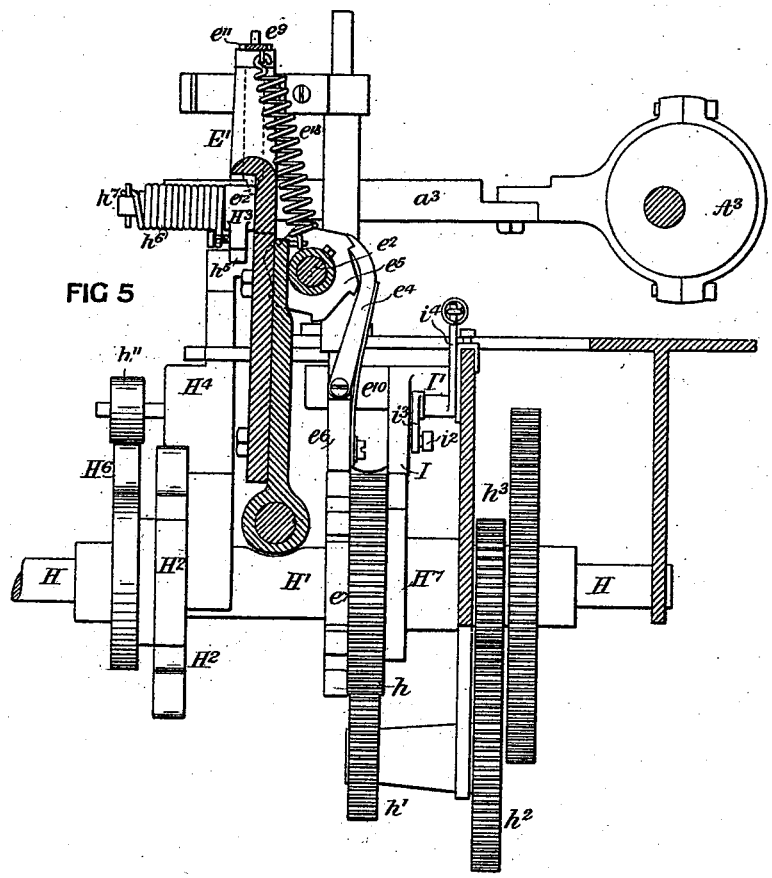
Figure 6:
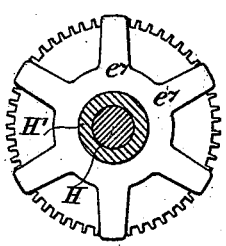
Figure 7:
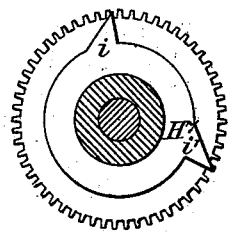
Figure 12:
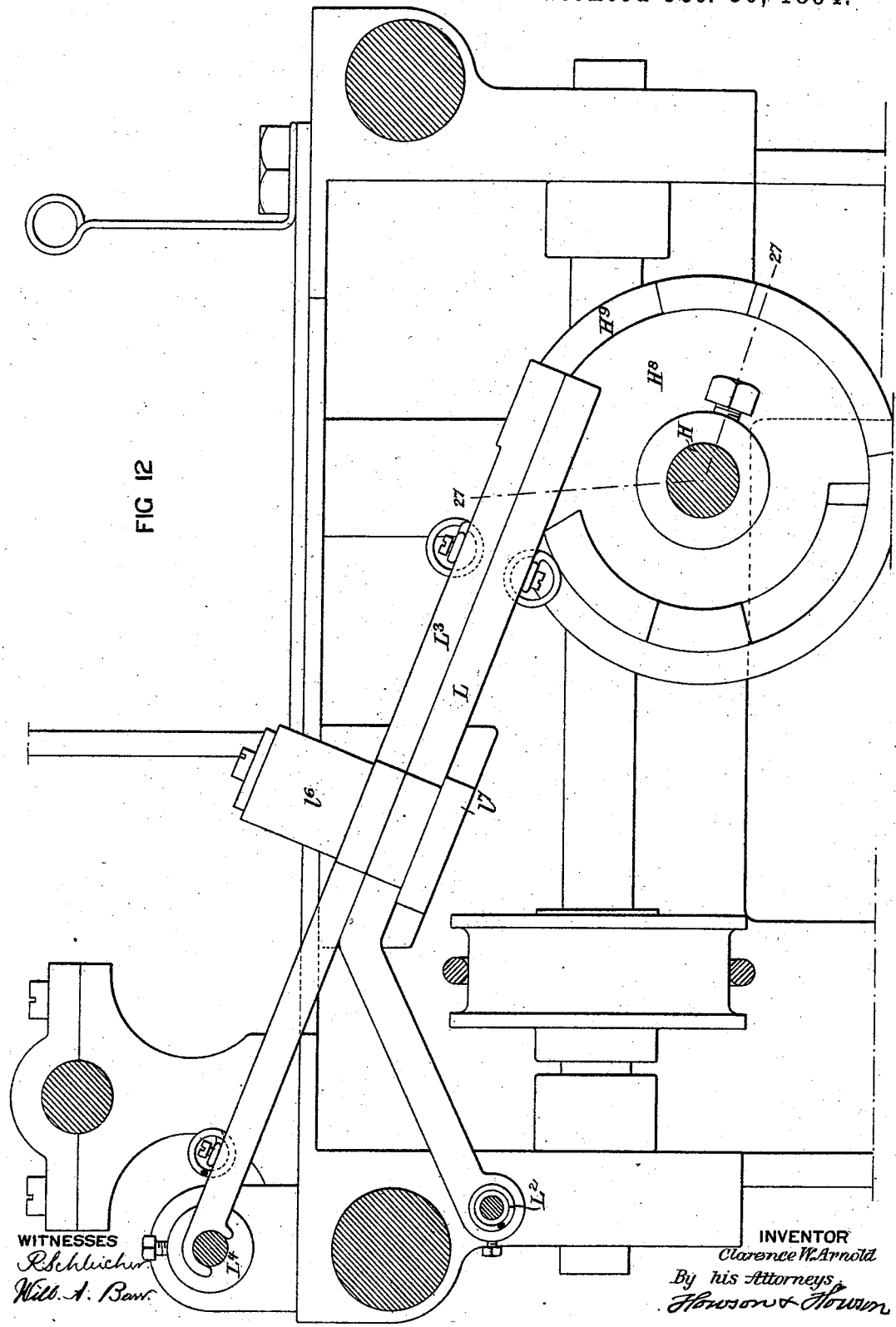
Figure 13:
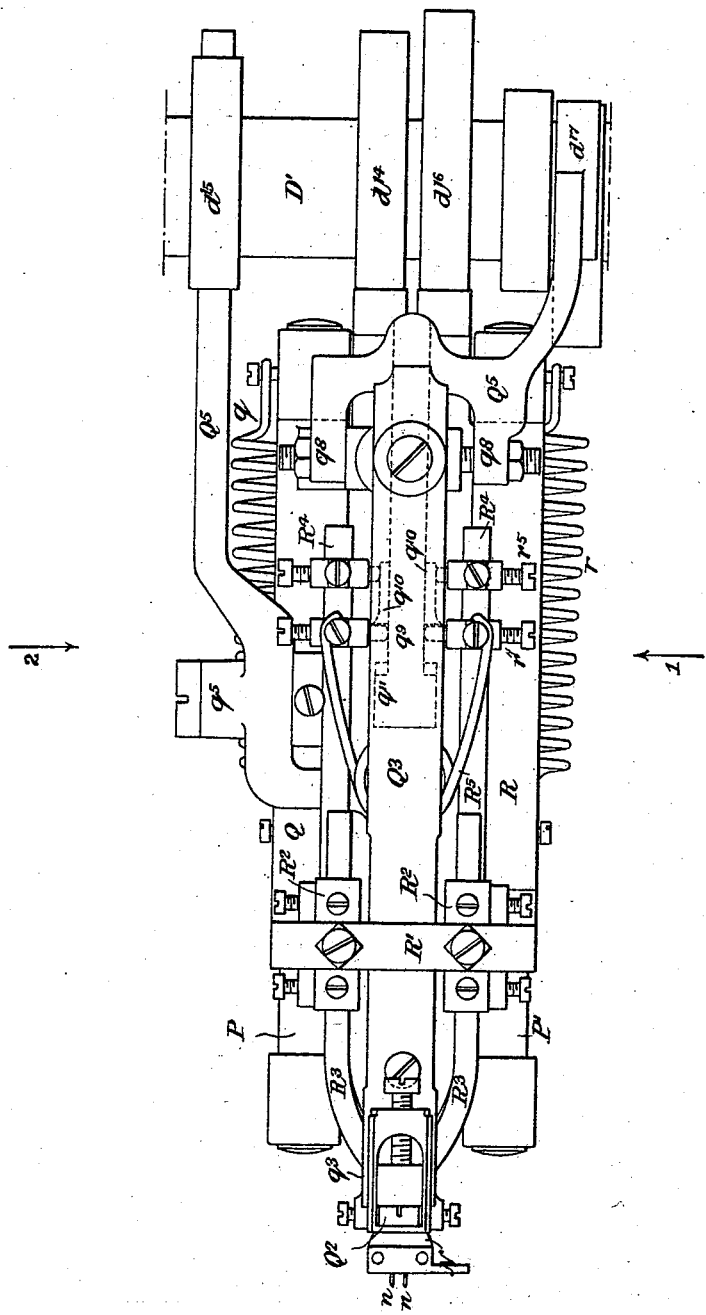
Figure 24:
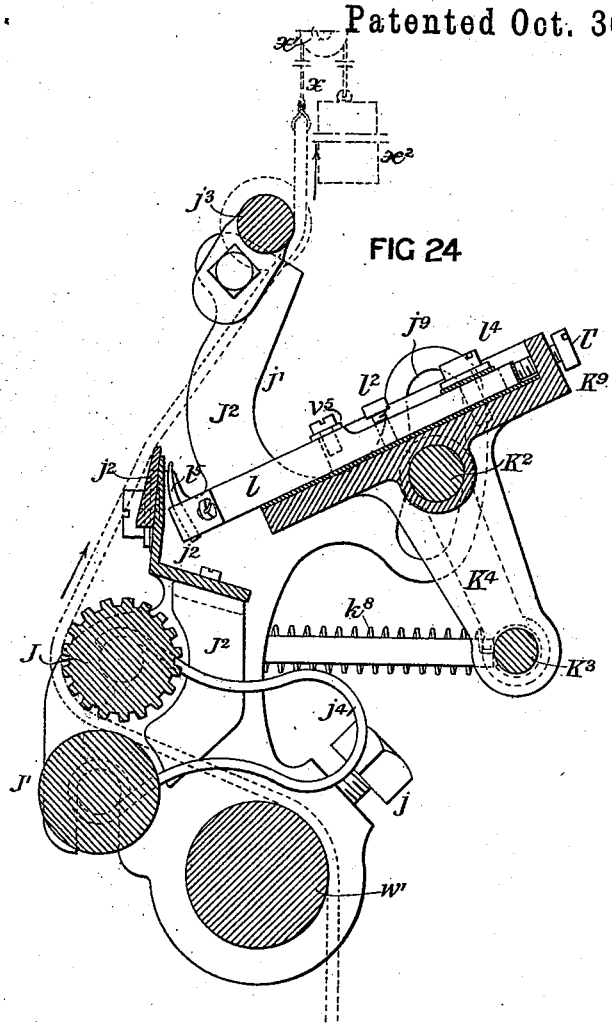
Figure 23:
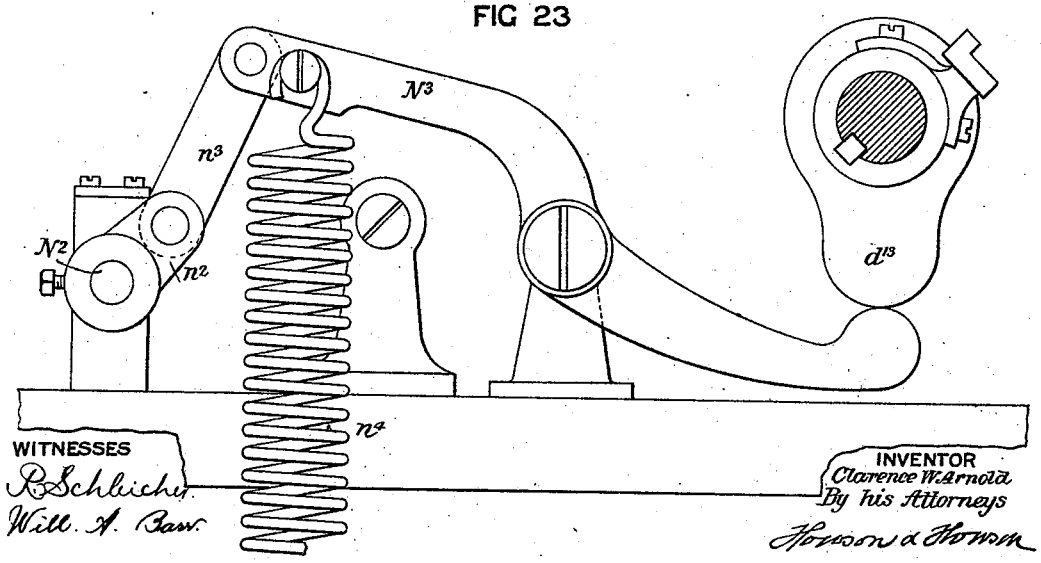
Figure 27:
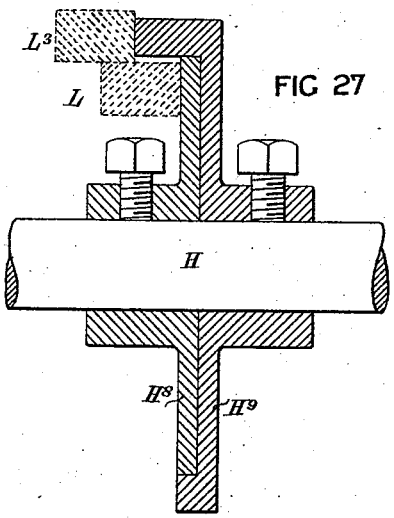
Figure 31:
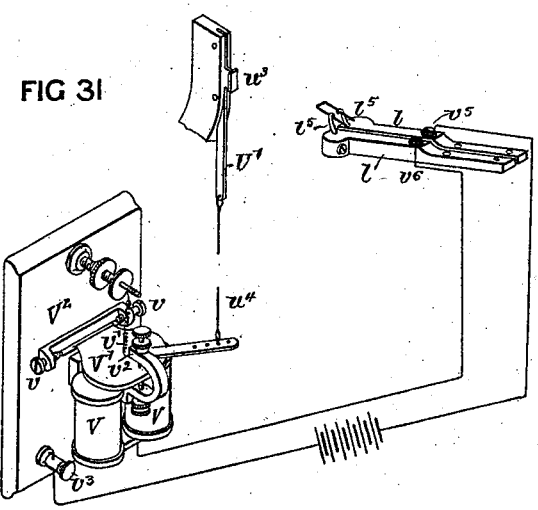
Figure 26:
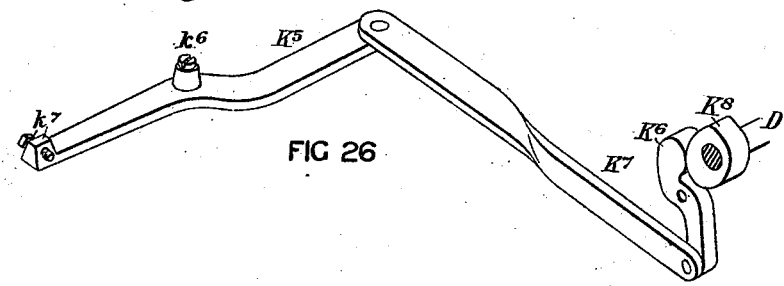
Figure 29:
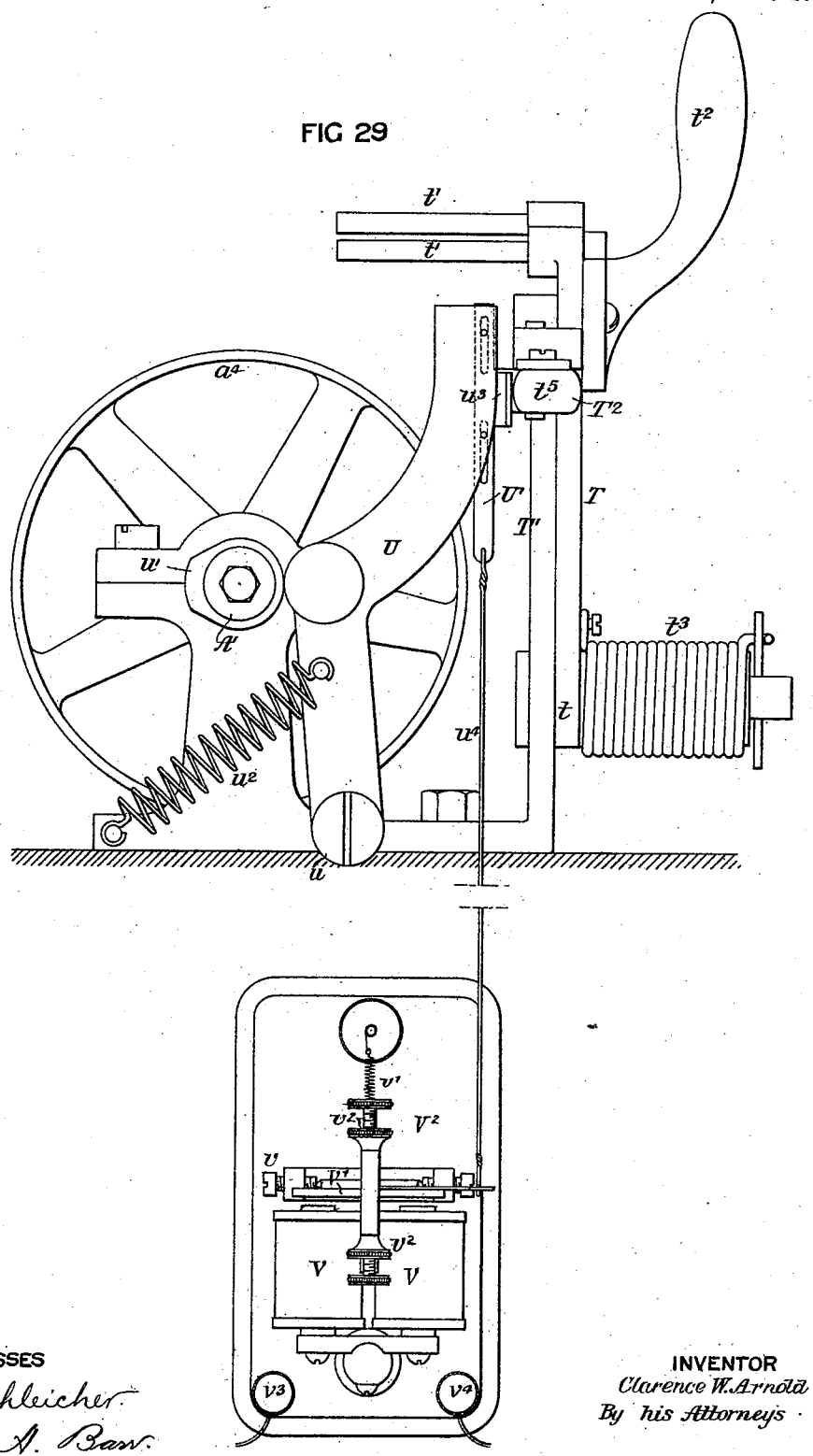

Figure 1 is a side view of my improved card sticking machine. Figs. $2^A$ and $2^B$, are plan views. Fig. 3, is a transverse sectional view on the line 3—3, Fig. $2^A$. Fig. 4, is a sectional view on the line 4—4, Fig. 3. Fig. 5 is a sectional view on the line 5—5, Fig. 3. Figs. 6 and 7, are detached views of cam wheels. Fig. 8, is a transverse section on the line 8—8, Fig. $2^A$ illustrating the feeding mechanism. Fig. 9 is a rear view of a strip of card clothing. Fig. 10 is a sectional view of the strip on the line 10—10, Fig. 9. Fig. 11, is a detached view of a detail of the shifter mechanism. Fig. 12, is a transverse sectional view on the line 12—12, Fig. $2^B$. Fig. 13, is a plan view of the card sticking mechanism on the carriage. Fig. 14, is a view looking in the direction of the arrow 1, Fig. 13. Fig. 15, is a view looking in the direction of the arrow 2, Fig. 13. Fig. 16, is a section on the line 16—16, Fig. $2^B$. Fig. 17, is a section on the line 17—17, Fig. $2^B$. Figs. 18 to 22, are diagram views of the card sticking mechanism. Fig. 23, is a section on the line 23—23, Fig. $2^B$. Fig. 24, is a section on the line 24—24, Fig. $2^B$. Fig. 25, is a detached view showing the method of securing the rope to the carriage. Fig. 26, is a detached perspective view of the vibrating mechanism for the carrier frame. Fig. 27, is a section on the line 27—27, Fig. 12. Fig. 28, is a plan view of the puncturing bar operating device detached. Fig. 29, is a side view illustrating the stop motion. Fig. 30, is a transverse view also illustrating the stop motion. Fig. 31, is a perspective diagram illustrating the wiring of the electric stop motion.

The machine may be divided into three parts: first, the part A, which is the mechanism for feeding the carriage and for giving motion to the main elements of the machine, (this part A is fixed at present, situated at one end of the machine:) the part B, which is the mechanism for holding and feeding the fabric or leather into which the card teeth are forced, and finally the part C which is the mechanism for puncturing the fabric or leather and bending and driving the teeth into the fabric. This mechanism is mounted on a carriage which traverses the width of the fabric and is propelled through the medium of a cable from the driving mechanism A.

Before proceeding to describe the details of the machine, I will briefly describe the operation.

The machine is at present arranged to stick the teeth in a fillet or a narrow web and the teeth are formed from a wire drawn from a reel at one end of the machine. The carriage is advanced intermittently and during the dwell the wire is bent so as to form a crown and two prongs and in the meantime the web or fabric is punctured in line with the prongs so that the prongs when moved forward will be guided into the openings. The tooth is not driven the full distance until the knee forming device on the opposite side of the fabric bends the prongs to form a knee giving each tooth the proper pitch, after which the tooth is driven home by the needle bar and as the carriage is fed forward the wire from which the teeth are formed is fed in line with the bending mechanism so as to form a new tooth. When the carriage reaches the end of the forward motion the fabric is fed forward presenting a new surface for the sticking mechanism on the carriage to insert another row of teeth.

The twill or staggering of the teeth so as to space them the proper distance apart on the face is effected in this machine by a cam having as many faces as the twills desired. While the carriage is at rest the feed pawl is adjusted by the cam to the proper distance so that when it feeds the carriage forward it adds to the throw of the carriage the distance from twill to twill.

The card shown in the drawings is a three twill card and the carriage is fed forward by the cam two steps from its first position and after its second step it is returned to its first position.

A' is the driving shaft of the machine mounted in suitable bearings on the frame W. This frame is supported upon suitable legs $w$ connected together by two bars $w'$, one on each side of the machine. These bars are round in the present instance and on them is mounted the carriage C' and fixed to one of the bars is the work holding device B.

The shaft A' is provided with a hand wheel $a$ and fast and loose pulleys $a^4$, $a^5$ and is geared to the longitudinal cam shaft D by miter wheels $a'$ and $d$.

The several cams for giving motion to the card sticking mechanism are mounted on a sleeve D' splined to the shaft D, so that while the sleeve travels with the carriage it rotates with the shaft.

$A^2$ is an eccentric on the shaft A' for feeding the carriage positively forward and $A^3$ is an eccentric for positively returning the carriage. The cam $A^4$ also mounted on the shaft A', controls the movement of the positive feed pawl $e$ carried by the reciprocating pawl arm E, which is reciprocated alternately by the eccentrics $A^2$, $A^3$, through their rods $a^2$, $a^3$, adapted to be thrown into and out of gear alternately with the arm E', which is connected to the arm E by a stiff spring $e'$ in the present instance, but these arms may be rigidly connected together, without departing from my invention. When the eccentric rod $a^2$ is coupled to the arm E' and the rod $a^3$ uncoupled by the shifting mechanism which is thrown into gear when the carriage reaches its rearward limit, the feed will be reversed and when the rod $a^3$ is coupled and the rod $a^2$ uncoupled when the carriage reaches its forward limit the feed will be again reversed.

On a cross shaft F, mounted in bearings under the bed of the machine is a toothed wheel F' with which engages the positive pawl $e$ and as this wheel is fast to the shaft it turns the shaft intermittently in either direction according to the feed of the pawl dictated by either of the eccentrics. On this shaft F is secured a drum $F^2$, to which is attached the wire rope G which extends to the opposite end of the machine and passes around a pulley $F^4$ on a cross shaft $F^3$. The ends of this rope are attached to each side of the carriage C'. In the present instance, as shown in Fig. 25, the rope G is adjustably secured to the carriage by bolts $g$, which can be readily taken up for wear or other adjustments. In the present instance the feed $e$ feeds the wheel F' only one tooth either way according to which eccentric $A^2$ or $A^3$ is connected to the arm.

In order to vary the feed of the carriage to make the necessary twill I mount in bearings on the arm E' a shaft $e^2$, Figs. 4 and 5, on which, in the present instance, is a six step cam $e^3$, which is rotated by a pawl $e^4$, acting upon a ratchet wheel $e^5$ secured to the shaft $e^2$. The pawl $e^4$ is pivoted to an arm $e^6$ pivoted to the frame of the machine at $e^{10}$ and acted upon by a cam $e^7$ on a sleeve H' mounted upon the longitudinal shifter shaft H and geared thereto by the train of gearing $h$, $h'$, $h^2$, $h^3$, so that the pawl will be operated in time with the rest of the machine.

The cam $e^3$ is shown in the present instance as a six step cam but it can be a three step cam for making the twill shown in Fig. 9, but by making it a six step cam and duplicating the steps, I am enabled to make a three twill or a six twill without changing the parts. If a six twill cam is made, however, the distance from the center of the steps will gradually increase. It will be seen that by inserting the cam $e^3$ between the two arms E and E', the normal movement of the carriage given by either of the eccentrics can be increased or diminished by an independent movement of the cam. The pawl $e$ is forced into gear with the wheel F' by a spring $e^8$ and raised by a lever $A^5$ pivoted at $a^6$. The short arm of this lever is acted upon by a cam $a^4$ on the shaft A' and this cam is so timed with the eccentrics $A^2$, $A^3$ that it will lift the pawl out of gear with the wheel F' when the eccentrics reach the limit of their forward stroke and release the pawl allowing it to be forced into gear with the wheel prior to the forward stroke of either of the eccentrics.

On the cross shaft F through which the carriage is fed is a friction wheel $f^{10}$ on which rests a brake shoe $f^{11}$ carried by a spring bar $f^{12}$. The object of this mechanism is to prevent the shaft moving beyond a predetermined point.

Mounted on the cam shaft D are two loose pinions $D^2$, $D^3$, Figs. $2^A$, $2^B$ and 11, adapted to be clutched to the sleeve D' as the carriage is fed up to either of the pinions and when either of the pinions is locked to the shaft it turns with it and as they are geared to the shifter shaft through the train of gears $d'$ and $d^2$ respectively, they turn the shifter shaft H and consequently the sleeve H', described above, which also carries the cam $H^2$ for locking the eccentric rods $a^2$, $a^2$. This cam acts on a vertical slide $H^4$ which is hooked at its lower end so as to span the shaft H, as shown by dotted lines in Fig. 3. This slide $H^4$ acts against the under side of an arm $h^4$ of a lever $H^3$. A spring $h^6$ coiled around the pivot $h^7$ attached at one end of the lever $H^3$ tends to move the lever in the direction indicated by the arrow. The arm $h^4$ of this lever is directly under the eccentric rod $a^3$ and the arm $h^5$ of the lever is directly under the eccentric rod $a^2$. Thus as the lever is operated by the cam through the medium of the slide $H^4$ it forces one or other of the eccentric rods up into engagement with the spring pawls $e^8$ or $e^9$. As shown in Fig. 3, the cam $H^2$ has raised the slide up and consequently the arm $h^4$ of the lever $H^3$ has also been raised throwing the eccentric rod $a^3$ into engagement with the pawl $e^9$ of the arm $E'$, and the arm $h^5$ of the lever $H^3$ has been drawn away from the eccentric rod $a^2$ which is allowed to fall clear of its pawl $e^8$ by its own weight. As soon as the high portion of the cam passes away from the slide $H^4$ the spring $h^6$ forces the arm $h^4$ down in the direction of the arrow and lifts the arm $h^5$ up throwing the eccentric rod $a^2$ into engagement with the pawl $e^8$ of the arm $E'$ and allowing the eccentric rod $a^3$ to drop clear of the pawl $e^9$.

$e^{13}$ is a spring connected to a cross bar $e^{11}$ which rests upon the upper ends of the pawls $e^8$ and $e^9$ and by this means the pawls are allowed to yield sufficiently so that when the slot $e^{12}$ in the upper portion of either of the eccentric rods is not in line with the pawls they simply rest upon the surface of the eccentric rods and when the eccentrics move the rods to the proper position the pawls will be forced into position by the spring $e^{13}$. A shoulder on each pawl limits its downward movement. One spring in the present instance is utilized for both pawls and one can raise and lower independently of the other but it will be understood that two springs may be used if necessary.

$H^5$ is a locking bolt pivoted at $h^8$ to the arm $E'$ and the projection $h^9$ is acted upon by the arm $h^5$ of the lever $H^3$ when it is lowered forcing the locking bolt $H^5$ from under the eccentric rod $a^2$ allowing it to fall out of engagement, but as soon as the cam $H^2$ allows the spring $h^6$ to return the lever a spring $h^{10}$ returns the locking bolt to its normal position under the eccentric rod so as to lock it into engagement with the lever $E'$ until the locking bolt is again thrown out by the lever $H^3$. This locking bolt $H^5$ is simply used as an emergency lock as I do not wish to depend upon the spring $h^6$ to lock the eccentric rod $a^2$ in position. The eccentric rod $a^3$ is locked in position by the cam $H^2$.

Secured to the shaft H is a cam $H^6$ which is so set in respect to the cam $H^2$ that at every third rotation of the shaft H it lifts the vertical slide $H^4$ by striking the roller $h^{11}$ in advance of the cam $H^2$. Thus while the cam $H^2$ has an even intermittent movement the slide $H^4$ is raised in proper time, the cam $H^6$ acting on the mechanism at every sixth twill.

On the sleeve $H'$ is a cam $H^7$, shown clearly in Fig. 7, having two abrupt raised portions $i\ i'$, which act upon the lever I pivoted at $e^{10}$ to the frame of the machine. Connected to this lever at $i^2$ is an arm $i^3$ of a lever $I'$. The arm $i^4$ of this lever is connected to a filler slide $I^2$ by a rod $i^5$ and spring $i^6$. The end of this rod $I^2$ is so set that it will be projected by the raised portions of the cam $H^7$ into one of the spaces between the teeth in the wheel $F'$. The slide is withdrawn by a spring $i^7$. The object of this slide is to allow the pawl to drop a tooth at intervals to form the twill or staggering of the teeth so that the teeth will be spaced the proper distance apart on the face. The slide $I^2$ prevents the pawl from dropping into a tooth at a certain point and allows the cam $e^3$ to move the arm E a distance equal to the twill.

I will now describe the mechanism for feeding the fabric forward and for binding the teeth to form the ends.

Referring now to Figs. 1, 2$^A$, 2$^B$, 8 and 24, J and $J'$ are the feed rollers for the fabric or leather. The feed roll J is mounted in suitable bearings on the frame $J^2$ adapted to the longitudinal bar $w'$ being secured thereto by set-screws $j$. The two ends $j'$ of the bar are tied together by the angle plate $j^2$ and bar $j^3$, Fig. 24, so that the fabric will pass, as shown by dotted lines in said figure, over the longitudinal bar $w'$ of the frame between the rollers J $J'$ up against the angle plate $j^2$ and in front of the bar $J^3$ the fabric or leather being fed in the direction of the arrow. The upper end of the fabric or leather, in the present instance, is tied to a cord $x$ which passes over the wheel $x'$ at the ceiling and has suspended from it a suitable weight $x^2$ so that the fabric or leather will be under tension at all times. The roller $J'$ is held in contact against the under side of the roller J by a U-shaped spring $j^4$, as shown in Fig. 24, and the roller J is fluted or corrugated, or otherwise roughened so as to impeach upon the fabric. The feed roll J has a gear at one end which meshes with a pinion $j^6$ on the stud $j^7$ mounted on a bracket $j^8$ secured to the logitudinal rod $w'$. On this stud and locked to the pinion $j^6$ is a ratchet wheel $j^8$, which engages a feed pawl $k$ on the short arm of a lever K pivoted on the stud $j^7$. The long arm of this lever K is acted upon by a cam $K'$ having abrupt projections $k'$. This cam is secured to the shaft H. A spring $k^2$ secured to the frame $J^2$ and to the short arm of the lever keeps the long arm of the lever in contact with the cam so that as the cam rotates the pawl will feed the ratchet wheel forward in the direction of the arrow, Fig. 8. A detent pawl $k^3$ pivoted at $k^4$ to the frame $J^2$ prevents the ratchet wheel $j^8$ returning with the pawl so that the fabric or leather has an intermittent forward feed, it being fed forward twice during the return of the shaft H. Pivoted to the front of the frame $J^2$ is the mechanism for bending the teeth after they are projected through the fabric to form the knee. The bar $K^2$ is hung by means of two adjustable pivot bolts $k^5$ adapted to a slot $j^9$ in the frame so that the bar can be raised or lowered as desired. The bar $K^3$ is connected to the bar $K^2$ by arms $K^4$ and acting on the frame composed of the two bars $K^2$, $K^3$ and arms $K^4$, $K^4$ is a lever $K^5$, Figs. 1 and 2, which is pivoted at $k^6$ to the frame of the machine and on the end of this lever is a screw $k^7$, Fig. 2, so that the amount of movement given to the rocking frame by the lever $K^5$ can be regulated. The lever $K^5$ is connected to a lever $K^6$ of a rod $K^7$ extending across the machine, as shown in Figs. 2, 3 and 26. The lever $K^6$ is acted upon by a cam $K^8$ on the shaft D so that at every revolution of the shaft D the pivoted frame will be vibrated. On this frame is mounted a carrier $K^9$, shown in Figs. 2 and 24, which carrier is adapted to slide on the bars $K^2$, $K^3$ of the vibrating frame as the two bars $l\ l$ which are longitudinally, vertically and laterally adjustable in the carrier by means of set screws $l'$, $l^2$, $l^3$ and are confined in place by screws $l^4$. On the end of each bar is a hook $l^5$ for engaging with the teeth of the card as they are projected through the fabric and the movements are so timed that when the teeth are projected through the fabric into the hooks the next movement of the carrier will turn down the ends of the teeth and bend them to form the knee, as shown in Fig. 10. This carrier $K^9$ travels with the carriage $C'$ and is connected thereto by a rod $K^{10}$ which is attached to an arm $C^2$ projecting from the carriage $C'$, as shown in Figs. 1 and 2. The vibrated frame on which the carrier is mounted is kept in contact with the lever $K^5$ in the present instance by a spring $k^8$ attached to the lower bar $K^3$ of the frame and to a stud on the frame $J^2$.

$H^8$ and $H^9$ are cams one resting within the other and each mounted in the shaft H, being secured by set screws in the ordinary manner. The cam $H^8$ acts upon the lever L pivoted at $l^6$ to a bracket $l^7$ on the frame of the machine. The opposite arm of this lever is bent and is connected to the lever $L'$ by a rod $L^2$ extending to the back of the machine, as shown in Fig. 11, and the upper end of this lever is forked and engages with the collar on the pinion $D^3$ and when the cam $H^8$ lifts the lever $L'$ and loose pinion $D^3$ in the direction of the arrows, Fig. 11 and quickly releases the loose pinion from the control of the projecting lug $d^3$, on the sleeve $D^8$. By this means the shifter shaft H is quickly released from the control of the shaft D. On the return movement of the carriage the lug $d^4$ on the sleeve $D'$ at the opposite side of the carriage $C'$ will engage with the lug $d^5$ on the loose pinion $d^2$ and will turn the shaft H through the gearing $d'$. The cam $H^9$ will then act upon the lever $L^3$, which is pivoted at $l^6$, and the opposite end of this lever is coupled to a rod $L^4$ having a forked arm $L^5$ which engages with the loose pinion $D^2$ and when the cam $H^9$ is in proper position it will quickly move the lever in the direction of the arrow, Fig. 11, and withdraw the loose pinion $D^2$ away from the projection $d^4$ on the sleeve $D'$, thus throwing the shaft H quickly out of engagement with the shaft D. By this mechanism the carriage is prevented from overthrowing when the carriage is at a high rate of speed.

In making the twill commencing at the first row when the carriage reaches the end of its return stroke and is to begin a new line, the filler slide $I^2$ is projected into the tooth of the feed wheel so that the feed pawl $e$ will move forward but will not engage with the tooth and will slip back. In the meantime the cam $e^3$ has moved the pawl the distance between the first and second twills and the cloth has been fed forward for a new line so that a new row of teeth will be placed in the cloth directly under the former row, but slightly in the rear and when the carriage has reached the limit of its return movement and in order to make the next twill the two eccentrics are thrown out of gear with the lever carrying the pawl $e$ so that the pawl will drop directly upon one of the teeth so that it will not drop in the space in advance and will fall back to the position. In the meantime one of the eccentric arms has been thrown into gear with the lever and the pawl completes its movement drawing the carriage forward the distance to make the required twill, the fabric being fed forward in the meantime to form a new line of teeth. At the completion of the third row the arm $H^3$ is thrown out of gear with the eccentrics and the pawl falls onto a tooth and then moves forward two twenty-fourths of an inch or the distance of two twills so that when it is moved by the eccentric then thrown into gear, it will move the feed pawl forward the proper distance so that the fourth row of teeth will be directly under the first row. At the end of the fourth row the filler slide is not necessary, the pawl dropping onto a tooth and as the eccentric engages the arm the pawl will drop back onto a tooth returning it and driving the wheel forward one twenty-fourth of an inch or one twill. At the end of the fifth row the nut is moved onto one of the spaces between the teeth and the cam so as to prevent the pawl $e$ entering the space. The pawl will then fall back into its recess again and the cam will be so timed as to move the arm one twenty-fourth of an inch, making the new and last row of teeth. At the end of the sixth row of teeth the pawl falls back by striking on top of a tooth, and the first row is repeated. Thus it will be seen that the filler slide only acts at the end of the second and fifth rows of teeth as at the end of the first, fourth and sixth rows the carriage being at the end of its forward movement it will fall back naturally.

I will now describe the mechanism on the carriage for feeding the wire, bending it and projecting it through the cloth, referring particularly to Fig. 2 and Figs. 13 to 22 inclusive.

Pivoted to a fixed shaft $c$ mounted on the carriage is a lever M. This lever also slides upon the shaft, being forced in one direction by the cam $d^{10}$ on the sleeve D' and elevated by a cam $d^{11}$. A spring $c'$ returns the lever M after it has been forced forward by the cam $d^{10}$. This lever M has two spring arms $m\ m'$ secured and bent as shown in Fig. 16, so as to form two gripping faces $m^2$, $m^3$ between which the wire from which is formed the tooth, passes, being guided by a guide plate $m^4$. The action of this lever M is to grasp the wire by the action of the cam $d^{11}$, carry it forward by the action of the cam $d^{10}$ and when it has reached its forward position to release the wire and return to its first position. The stop $C^2$, on which the spring arm $m'$ of the lever rests, is in such a position that when the cam $d^{11}$ acts it will retard the spring arm $m'$ holding it while the spring arm $m$ moves forward in the direction of its arrow, Fig. 16, while the spring arm $m'$ will slide in the direction of its arrow on the stop $C^2$ making a side grip of the wire. The wire is taken from a reel M' pivoted to an arm $m^5$ at one end of the machine. Situated at one side of the lever M is a retaining lever M² pivoted at $c^2$ to a bearing on the frame of the machine. This lever is acted upon by a cam $d^{12}$ on the sleeve D' and has a sliding arm $m^6$ which is forced against a bearing plate $c^3$ on the portion $c^2$ of the carriage by a spring $m^7$. The action of this lever is to lock the wire to the carriage so that on the return of the lever M the wire will not be carried back with it. By these two levers M and M² the wire is intermittently fed forward.

Before the wire is inserted into the cloth the cloth is punctured for the reception of the teeth.

N is the puncturing bar having at its inner end two prongs $n$, Figs. 13, 14, 15 and 28. This puncturing bar is pivoted to a crank pin $n'$ on a crank N' mounted on a shaft N² adapted to bearings in the frame of the machine and on the opposite end of this shaft is an arm $n^2$ connected to a lever N³ by a link $n^3$ and this lever is acted upon by a cam $d^{13}$ on the sleeve D'. The lever N³ is held in contact with the cam by a spring $n^4$, Fig. 23. The puncturing bar is raised by the crank shaft onto a platform $n^5$, the crank being in such a position that it will be just over the center as the bar rests upon the platform and will hold it down upon the platform as it is moved forward. The bearing $c^4$ being a vertically sliding bearing held down by a spring $c^5$ allows the shaft to yield sufficiently so that the puncturing bar will have a firm footing on the platform and will slide freely forward to puncture the cloth.

Referring to Fig. 28, the shaft N² is pressed forward by a spring $n^6$ which bears against a collar on the shaft and the rear end of the puncturing bar N slides in a bearing formed by a spring plate $n^7$ mounted on a sliding bar $n^8$ adapted to bearings on the carriage C', a spring $n^9$ keeping the plate against the bar N so that when it is wished to remove the puncturing bar for sharpening the points or for repairing them all that is necessary is to withdraw the pin $n'$ by compressing the spring $n^6$ thus releasing the bar from the crank shaft after which the bar can be readily removed from the rear of the machine.

I will now describe the mechanism for bending the wire and forcing the teeth into the cloth.

P, Fig. 15, is a slide rod mounted in standards $c^6$ projecting from the carriage C' and on this slide rod P is mounted a slide Q moved forward by a cam $d^{14}$ and returned by a spring $q$. Thus the slide Q is reciprocated toward and from the cloth. The slide Q carries the crowner Q' and the doubler Q². The crowner Q' is in the form of a sliding bar pressed forward by a spring $q'$, Fig. 15, but is controlled by the frame R' on the slide R and as soon as the crowner is released by the frame R' it will be pressed forward by the spring, being in the meantime carried by the slide P as it moves forward. The crowner is also retracted by the frame R as soon as the tooth is driven. Attached to the carriage Q at $q^2$ is a spring bar Q³ on the end of which is secured the doubler Q² by means of the clamp $q^3$ and the side set screws $q^4$ so that the doubler can be raised and lowered and adjusted sidewise. On the end of the spring arm Q³ is a head Q⁴ to which the coupling parts are attached so as to make this portion of the bar perfectly rigid. The doubler is raised by a cam $d^{15}$ on the sleeve D' acting upon one end of a lever Q⁵ pivoted at $q^5$ to the slide Q. The opposite end of the lever rests under a projection $q^6$ of the head Q⁴ so that when the tooth is driven the doubler is quickly elevated by the cam $d^{15}$ through the medium of the lever Q⁵ and as soon as the lever is released the spring arm Q³ will resume its position in front of the crowner. The back of the doubler is grooved for the reception of a projection $q^7$ on the end of the crowner and this projection is notched for the reception of the wire so that when the crowner and doubler come together they confine the wire and shape the crown of the tooth. The bending of the tooth is accomplished by arms carried by the slide R. The slide R is mounted on a bar P' adapted to standards on the frame and is moved forward by the cam $d^{16}$ and retracted by a spring $r$. (Fig. 14.) Pivoted to the frame R' at each side of the spring plate Q³ are pivot blocks R² mounted on centers $r'$ (Fig. 14) so that the arms R³ can be moved toward and from the crowner so as to bend and hold the wire in the bent position until it is forced in the cloth. The arms R³ are bent as shown in Figs. 13 and 14 and are longitudinally adjustable in the blocks R² being held in position by set screws $r^2$. Projecting rearwardly from each block is an arm R⁴ longitudinally adjustable in each block being held in position by set screws $r^3$. On each arm are two screw pins $r^4$, $r^5$, which are so set as to be in the range of the cam lever Q⁵ pivoted at $q^8$ to a standard on the slide Q. This cam lever $Q^5$ is acted upon by a cam $d^{17}$ on the sleeve $D'$, as shown clearly in Fig. 14. The arm $q^9$ of this lever $Q^5$ extends between the arms $R^4$ and has cam blocks $q^{10}$ at each side arranged in such a position as to push the arms $R^4$ away from each other and consequently push the arms $R^3$ together so as to bend the wire as shown in Fig. 20 and quickly release the arms so that they will remain in the position shown in Figs. 21 and 22, guiding the arm to the tooth until they are projected in the cloth, when they will be released from the control of the portion $q^{11}$ of the lever $Q^5$ and the spring $R^5$ will draw the two arms $R^4$ together and consequently move the arms $R^3$ away from each other in which position they remain until again moved forward to bend a new tooth. Attached to the portion $C^2$ of the carriage is a fixed guide $c^8$ through which passes the wire from the feeding mechanism to the cutter. This cutter S has a fixed blade $s$ and a pivoted blade $s'$. The movable blade $s'$ is pivoted to the fixed blade $s^2$ and the fixed blade is adjustable on the carriage, being secured in position by a set screw $s^3$ (Fig. 14.) The movable blade $s'$ is pivoted to a rod $s^4$, which is connected to an arm $S'$ at $s^5$, the arm being pivoted at $s^6$ to a carriage and is acted upon by a cam $d^{18}$ on the sleeve $D'$ and the cam is so set that the cutter will act as soon as the wire is grasped by the crowner and doubler. A spring $s^7$ connected to the rod $s^4$ opens the cutter as soon as the cam has acted. Thus it will be seen that the wire is fed forward from the reel by the nipping lever M and when the nipping lever has reached its forward movement the retaining lever $M^2$ holds the wire in its projected position, allowing the lever M to return. The wire will thus be fed the proper distance across the face of the crowner, as shown in Fig. 18, when it will be grasped by the crowner and doubler and at the same time severed by the cutter. The arms $R^3$ will then be moved forward, as shown in Fig. 19, bending the wire around the doubler. When the arms reach a certain forward point they will be forced together, as shown in Fig. 20 so as to put an extra bend in the wire. The arms are then spread apart again and will act as guides for the prongs of a tooth so that when the crowner and doubler move forward the arms $R^3$ will guide the ends of the wire until they are projected into the cloth and bent, when they will spread apart clear of the crowner and doubler returning to their first position; the doubler in the meantime being elevated so as to free the tooth from its control. As soon as the tooth is projected through the cloth the hooks $l^5$ on the opposite side of the cloth are drawn down after the tooth has passed through them so as to make the knee in the tooth, as clearly shown in Fig. 10. After this knee is made the tooth is driven all the way into the cloth by the head of the puncturing bar M.

I provide the machine with an electrical stop motion which is so constructed that the tooth being acted upon completes the circuit and should the tooth not be projected through the cloth the device is so constructed that the belt will be shifted automatically and the machine stopped.

Referring particularly to Figs. 1, 2, 29 and 30, the shaft $A'$ is provided with a fast pulley $a^4$ and a loose pulley $a^5$ and pivoted to a standard $T'$ on the frame of the machine at $t$ is a belt shifter T having arms $t'$ between which passes one run of the belt. This shifter is provided with a handle $t^2$ so that the operator can shift the belt when necessary. Pivoted to the standard $T'$ is a lever $T^2$ having a lug $t^2$ which engages with the shifter arm T and holds it in position against the pressure of a spring $t^3$ in line with the fast pulley $a^4$. As soon as this lever T is operated so as to release the shifter arm the spring $t^3$ will throw the shifter arm, which in turn will carry the belt onto the loose pulley. The movement of the shifter arm is limited by lug $t^4$ on the standard $T'$.

Pivoted to the frame of the machine at $u$ is a vibrating arm U moved forward by a cam $u'$ on the end of a shaft $A'$ and returned by a spring $u^2$. In the head of this arm is a slideway in which slides a flat bar $U'$ having a head $u^3$ which when in the position shown in Fig. 29, will press against the arm $t^5$ of the lever $T^2$ forcing it in the direction of its arrow Fig. 2 and withdrawing the lug $t^2$ from the shifter arm T which will be thrown by the spring $t^3$ in line with the loose pulley, but when the bar $U'$ is drawn down so that the head $u^3$ will clear the arm $t^5$ of the lever the said lever will not be affected by the vibrating movement of the arm U and the electrical mechanism is so constructed that when the circuit is made the bar $U'$ is drawn down so that the belt will not be shifted as long as the machine is projecting teeth through the cloth.

The electrical mechanism consists of a magnet V, an armature $V'$, pivoted at $v$ to a base $V^2$, and a rod $u^4$, which extends from the bar $U'$ down to the armature $V'$ as shown in Figs. 29 and 30; the armature being retained in elevated position by a spring $v'$ which is also of sufficient strength to elevate the bar $U'$. The armature is adjusted by set screws $v^2$. The wires extend from the binding posts $v^3$ and $v^4$ to the bars $l\ l$, being confined to the bars by binding posts $v^5$, $v^6$, so that a circuit is made through the looper bars, their hooks and the tooth projected through the fabric and as each tooth is projected the circuit is made, the armature drawn down, drawing with it the bar $U'$ so that the head $u^3$ will pass under the lever $T^2$, but should the wire give out or a tooth be accidentally twisted so as not to pass through the fabric or one of the hooks be broken the circuit will not be made and the bar $U'$ will remain in the elevated position and its head $u^3$ will come in contact with the lever $T^2$ and move it, throwing out the lug $t^2$ and the spring $t^3$ will shift the arm T and the belt over to the loose pulley, thus stopping the machine.

It will be understood that the hooked bars $l\ l$ are insulated from each other so that the circuit must necessarily be made through the tooth.

I claim as my invention—

1. The combination of the frame, the driving shaft mounted thereon, forward feed and return feed eccentric mounted on said driving shaft, a vibrated arm E', eccentric rods adapted to engage with said arm, mechanism controlled by the carriage for throwing the eccentric rods into and out of engagement with said arm, a feed arm E connected to the arm E', a pawl on said feed arm, a feed shaft, a feed wheel on said shaft with which the pawl engages, a carriage connected to said feed shaft, substantially as described.

2. The combination of the frame, the driving shaft mounted thereon, a carriage adapted to travel on the frame, a feed shaft, a rope or chain connecting the feed shaft with the carriage so that on the movement of the feed shaft in either direction it will move the carriage, reversing mechanism between the driving shaft and feed shaft for reversing the movement of the feed shaft, said reversing mechanism being controlled by the carriage, substantially as described.

3. The combination of the frame, the carriage mounted thereon, mechanism on said carriage for bending and setting the teeth, a carrier and feeding mechanism for the material in which the teeth are set, the driving shaft, a feed shaft for the carriage, a shifter shaft intermittently operated by the mechanism controlled by the carriage, reverse feed mechanism for the carriage controlled by the shifter shaft, substantially as described.

4. The combination of the frame, carriage mounted thereon, mechanism on said carriage for bending and setting the teeth, a carrier and feeding mechanism for the material in which the teeth are set, the driving shaft, a feed shaft for the carriage, a shifter shaft intermittently operated by the mechanism controlled by the carriage, reverse feed mechanism for the carriage controlled by the shifter shaft, a carrier for the material in which the teeth are set, mechanism for feeding said material also controlled by said shaft, substantially as set forth.

5. The combination of the driving shaft A', the eccentrics $A^2$, $A^3$ on said shaft, eccentric rods $a^2\ a^3$, an arm E' adapted to engage with said eccentric rods, a shifter shaft H, a cam thereon, lever $H^3$ pivoted to the arm E', a slide $H^4$ acted upon by the cam and acting upon the lever, said lever engaging with one or other of the eccentric rods, the carriage, the feed shaft for the carriage, a feed wheel F' thereon, and a feed pawl $e$ driven by either of the eccentrics through the arm E', substantially as described.

6. The combination of the driving shaft, the forward feed eccentric and the return feed eccentric mounted thereon, rods connected to said eccentrics, a pivoted arm E' adapted to engage with either one of the said eccentric rods, mechanism for throwing the rods into and out of engagement with said arm, a feed arm E, a feed shaft for the carriage driven by said arm, and mechanism between the arms E and E' to alter the position of the arm E in respect to the arm E', substantially as described.

7. The combination in a card setting machine, of the vibrated arm E', the feed arm E, a cam shaft $e^2$, a cam thereon mounted between the two arms so as to vary the position of the arm E in respect to the arm E', a feed shaft driven by the said feed arm E, a carriage driven by the feed shaft, teeth setting mechanism on said carriage, substantially as described.

8. The combination of the pivoted arm E, driving mechanism therefor, mechanism for shifting said driving mechanism, a feed arm E', a cam shaft, a cam thereon having a series of steps, said cam being mounted between the two arms, a feed shaft, carriage controlled by the feed shaft, mechanism for turning said cam to make the twill as the teeth are set, substantially as described.

9. The combination in a card setting machine, of the driving shaft, the eccentric rods, a pivoted arm E', mechanism for throwing either one of said rods into engagement with the arm, a pivoted arm E, a feed pawl thereon, cam shaft $e^2$ carried by the arm E', a cam having a series of steps engaging with the arm E, a ratchet wheel $e^5$, a pawl $e^4$, a cam $e^7$, with mechanism for driving said cam at the end of the stroke of the carriage to form the twill, substantially as set forth.

10. The combination in a card setting machine, of the driving shaft, the forward and return feed eccentric thereon, eccentric rods, pivoted arm E', pawls on said arm adapted to engage with either of the eccentric rods, a pivoted lever $H^3$ acting upon the rods to throw them into engagement with the arm E', a spring for moving the lever in one direction, a slide $H^4$ for moving the lever in the opposite direction, a shifter shaft, a sleeve on said shaft, a cam on said sleeve for actuating the slide, the feed arm E, a feed shaft F controlled by said arm, a carriage driven by the feed shaft, substantially as described.

11. The combination of the driven arm E', a feed arm E, a cam $e^3$ mounted between the two arms so as to vary the distance between the arms, a spring for drawing the arms together, a feed pawl $e$ carried by the arm E, mechanism for raising and lowering the said pawl, a toothed wheel F', a feed shaft F upon which said wheel is mounted, a carriage driven by said shaft, said carriage having the mechanism for setting the teeth, substantially as described.

12. The combination of the driving shaft, the eccentrics thereon, eccentric rods, a pivoted arm E', feed mechanism controlled by said arm, a carriage fed by said mechanism, a shifter shaft, a sleeve driven by said shaft, a cam on said sleeve having a slow movement, the intervening mechanism between the cam and the eccentric rods for shifting said rod, quick acting cam on the shifter shaft, acting on the intervening mechanism to quick shift said mechanism, substantially as described.

13. The combination of a driving shaft, eccentrics $A^2$, $A^3$, their rods, arms E E', driven by either one of said eccentrics, a feed pawl $e$ carried by the arm E, a cam $H^4$ on the driving shaft, a lever $A^5$ acted upon by said cam and acting upon the pawl, a feed shaft, a feed wheel thereon, with which the pawl engages, a carriage controlled by the feed shaft, substantially as described.

14. The combination of the feed pawl, the feed shaft, the toothed wheel on said shaft with which the pawl engages, a carriage on which is mounted the card setting mechanism, a slide $I^2$ adapted to be projected into one of the spaces of the teeth of the feed wheel to allow the pawl to skip one tooth at a certain time, substantially as described.

15. The combination of the feed pawl, the feed shaft, a toothed wheel thereon with which the pawl engages, a carriage controlled by said feed shaft, mechanism mounted on said carriage for setting the teeth, a slide $I^2$ adapted to be projected into the space between the teeth of the feed wheel, an intermittently operated cam $H^7$ for actuating the slide, substantially as described.

16. The combination in a card setting machine, the driving shaft, the longitudinal cam shaft geared thereto, a sleeve adapted to slide on and turn with said cam shaft, cams on said sleeve for actuating the wire feeding and tooth forming and setting mechanism, a carriage upon which said mechanism is mounted, a shifter shaft thrown into and out of engagement with the cam shaft by the carriage, substantially as described.

17. The combination of the driving mechanism and feeding mechanism for the carriage, the cam shaft D, cam sleeve D' driven by the cam shaft but adapted to travel with the carriage, cams on said sleeve for actuating the wire feeding and tooth forming and setting mechanism, the shifter shaft H, two trains of gear wheels $d'$ $d^2$, clutching mechanism carried by the cam sleeve adapted to throw either one or the other of the train of gears into engagement with the driving mechanism, with reverse feeding mechanism controlled by the shifter shaft for reversing the movement of the carriage, substantially as described.

18. The combination of the frame, the driving mechanism, the cam shaft, a carriage adapted to slide on the frame mechanism on the carriage for feeding and bending the wire forming the teeth, a cam sleeve mounted on the cam shaft and adapted to travel with the carriage, pinions $D^2$, $D^3$ loose on the shaft, said pinions being geared to the shifter shaft, projections on the cam sleeve adapted to engage with lugs on the loose pinions at either end of the stroke of the carriage, cams $H^8$ $H^9$, their levers L and $L^3$ connected to their respective loose pinions $D^2$ $D^3$ and so set that they will move their pinions so as to entirely free them from the control of the cam sleeve at a given time, substantially as set forth.

19. The combination of the driving mechanism, the carriage, the shaft D, the cam sleeve thereon adapted to turn with the shaft but slide with the carriage, pinions $D^2$ $D^3$, a shifter shaft H geared to said pinions, projections at each end of the sleeve adapted to engage with the lugs on the pinions, rods $L^2$ $L^4$ having arms engaging with the pinions $D^2$ $D^3$, levers L, $L^3$ engaging with their respective rods, cams $H^8$, $H^9$ acting upon said levers, said cams being mounted upon the shifter shaft, the whole arranged substantially as and for the purpose set forth.

20. The combination of the frame, the driving mechanism, the carriage, the puncturing and tooth feeding and bending mechanism mounted on the carriage, feed rolls in front of said mechanism adapted to feed the material into which the teeth are set, a ratchet wheel on one of said feed rolls, a lever K having a pawl $k$ adapted to engage with the ratchet wheel, a shifter shaft, a cam K' thereon for actuating the lever so as to feed the material after a line of teeth have been set, substantially as described.

21. The combination in a card setting machine, of the frame, feeding mechanism, the carriage, puncturing and tooth forming mechanism mounted on the carriage, feed rolls mounted in front of the carriage, mechanism for intermittently operating said feed rolls, a rocking frame, hooked bars carried by said frame adapted to bend the tooth as it is projected through the material, a driven cam $K^8$, a lever $K^6$ acted upon by said cam, a horizontally arranged lever $K^5$ connected to the lever $K^6$ and acting upon the rocking frame, substantially as described.

22. The combination in a card setting machine, of the feeding mechanism, the carriage, puncturing and tooth forming mechanism mounted on said carriage, the driven shaft D, cam sleeve mounted thereon adapted to actuate the mechanism mounted on the carriage, a cam $K^8$, a rocking bar, a frame thereon actuated by said cam, hooks on said frame for bending each tooth as it is passed through the material, said frame being connected to the carriage, substantially as described.

23. The combination of the driving mechanism, the carriage, the feeding mechanism for feeding the material into which the teeth are set, a rocking bar mounted on the frame of the machine, a hook carrying frame adapted to slide on but rock with the bar, an arm on the carriage connected to said frame, and mechanism for rocking the bar, substantially as described.

24. The combination of the driving shaft, the fast and loose pulleys thereon, a belt shifter, a vibrating arm, a cam on the driving shaft adapted to vibrate the arm, a spring for throwing the belt shifter in one direction, a catch for retaining the shifter against the pressure of the spring, a block adapted to be inserted between the vibrating arm and the catch so as to release the shifter, an armature connected to said block, an electro magnet, the hooked arms for bending the tooth as it is projected through the material, insulating material between the hooks, wires extending from each hook to the magnet, the parts being so arranged that when a tooth is properly projected through the material the circuit will be closed and the magnet will draw the block from between the vibrated arm and the catch, substantially as described.

25. The combination of the driving shaft, fast and loose pulleys thereon, a spring actuated belt shifter, a latch for holding the belt shifter against the pressure of the spring, a pivoted arm, a cam for vibrating said arm, a sliding block mounted in the arm adapted to be raised and lowered as each tooth is projected, an armature connected to the sliding block, an electro magnet, hooks for bending the tooth as it is projected through the material, said hooks being insulated from each other, wires extending from the hooks to an electro magnet so that when a tooth is properly set the circuit will be closed and will draw the block from between the vibrated arm and the catch, substantially as described.

26. The combination of the driving shaft, fast and loose pulleys thereon, the pivoted belt shifter T, a frame T', stops on said frame for limiting the movement of the shifter, spring $t^3$ for throwing the shifter in line with the loose pulley, a pivoted catch $t^2$ adapted to hold the shifter against the pressure of the spring and in line with the fast pulley, a vibrated arm U, a cam $u'$ on the driving shaft adapted to vibrate the arm, a slide U' having a head or block $u^3$, a spring for holding said head in line between the vibrated arm and the catch, an armature connected to said slide, an electro magnet, the hooks adapted to engage with the tooth when it is projected through the material, wires connecting the hooks of the armature substantially as described.

27. The combination in a card sticking machine, of the holder for the material, the carriage, puncturing bar N, a shaft $N^2$, a crank thereon, a pin on said crank engaging with the puncturing bar N, platforms $n^5$ upon which the puncturing bar rests as it slides forward, a loose band for the shaft, and means for driving the shaft, substantially as described.

28. The combination in a card sticking machine, of the puncturing bar N, the crank shaft, crank thereon, a pin on the crank adapted to the bar, mechanism for driving the shaft, a platform onto which the puncturing bar is lifted by the crank and on which the bar slides as it is moved forward by the crank, a vertically movable bearing for the shaft and a spring resting on said bearing, substantially as described.

29. The combination of the crowner, the doubler in front of the crowner, means for moving the doubler, a slide carrying the crowner, a cam acting on said slide, bending arms on each side of the crowner adapted to bend the tooth over the doubler, blocks carrying the arm, pivoted in a sliding frame, a cam for operating said frame, a lever $Q^5$, a cam acting on said lever, an arm extending from said lever, cam blocks $q^{10}$ and $q^{11}$ the end of said arm being enlarged, with screws carried by extensions of the arms $R^3$, substantially as described.

30. The combination of the carriage, a frame R adapted to reciprocate on said carriage, a head mounted on said frame, pivoted blocks mounted in the head, bending arms $R^3$ secured to the blocks, each block having a rearwardly extending arm $R^4$ a slide Q, a crowner carried by side slide, and a doubler mounted in front of the crowner, means for moving said doubler, a pivoted lever $Q^5$ carried by the slide Q, a cam for operating said lever, said lever controlling the side movement of the pivoted arms $R^3$, with cams for actuating the slides Q and R, substantially as described.

31. The combination in a card sticking machine, of the crowner and doubler, mechanism for operating the same, a slide R, the cam for actuating said slide, pivoted blocks $R^2$ mounted on the slide, bending arms $R^3$ adjustably mounted in each block, rearwardly extending arms $R^4$ one mounted in each block, said arms being adjustable, set screws $r^4$, $r^5$ in said arms, a lever $Q^5$ having an arm $q^9$, cam blocks $Q^{10}$ on said arm, a head $Q^{11}$, and a spring tending to draw the arms $R^4$ together, substantially as described.

32. The combination in a card setting machine, of the carriage, puncturing bar N, a crank shaft $N^2$, crank pin $n'$ thereon carrying the puncturing bar, with a spring bearing $n^7$ for the rear end of the puncturing bar whereby on moving the bearing the puncturing bar can be readily detached from the crank shaft, and withdrawn from the machine, substantially as described.

33. The combination in the wire feeding mechanism of a card setting machine, the pivoted lever M, a cam for raising one end of such lever, spring bars $m$ $m'$ forming the opposite arm of the lever and having jaws between which the wire passes and a fixed table upon which the bars are forced when the cam actuates the lever so as to clamp the wire, substantially as described.

34. The combination in the wire feeding mechanism of a card setting machine, the pivoted lever M, a cam for raising the rear arm of said lever, the spring arms $m$ $m'$ attached to the lever near the fulcrum, one arm $m$ being above the lever and the other arm $m'$ being below the lever, a jaw $m^2$ on the spring arm $m$ and a jaw $m^3$ on the arm $m'$, a fixed table $C^2$ upon which the arm $m'$ rests so that when the lever is actuated by the cam the jaws will clamp the wire, substantially as described.

35. The combination in the wire feeding mechanism of a card setting machine, of the feeding lever having spring clamping arms $m\ m'$ between which the wire is clamped, a cam $d^{11}$ for raising the lever and clamping the wire and a cam for laterally moving the lever for feeding the wire forward and a spring for returning the lever, substantially as described.

36. The combination in the wire feeding mechanism of a card setting machine, the pivoted lever $M^2$, the cam for raising one arm of the lever, an extension $m^6$ on the opposite arm, a table having a fixed jaw, a jaw on the extension of the lever, said jaw being forced against the fixed jaw as the opposite ends of the levers are raised by the cam, substantially as described.

37. The combination of the pivoted lever $M^2$, the cam for lifting one arm of the said lever, a sliding extension $m^6$, a spring secured to the extension and to the lever, a jaw carried by the said extension, a fixed table having a fixed jaw between which and the jaw of the extension the wire is clamped and means for actuating the cam, substantially as described.

In testimony whereof I have signed my name to this specification in the presence of two subscribing witnesses.

CLARENCE W. ARNOLD.

Witnesses:
 HENRY HOWSON,
 WILLIAM A. BARR.